US009445128B2

United States Patent
He

(10) Patent No.: US 9,445,128 B2
(45) Date of Patent: Sep. 13, 2016

(54) SYSTEM AND METHOD OF DETERMINING DEBLOCKING CONTROL FLAG OF SCALABLE VIDEO SYSTEM FOR INDICATING PRESENTATION OF DEBLOCKING PARAMETERS FOR MULTIPLE LAYERS

(75) Inventor: Zhongli He, Austin, TX (US)

(73) Assignee: FREESCALE SEMICONDUCTOR, INC., Austin, TX (US)

(*) Notice: Subject to any disclaimer, the term of this patent is extended or adjusted under 35 U.S.C. 154(b) by 1957 days.

(21) Appl. No.: 11/608,690

(22) Filed: Dec. 8, 2006

(65) Prior Publication Data

US 2008/0137753 A1    Jun. 12, 2008

(51) Int. Cl.
| | |
|---|---|
| H04B 1/66 | (2006.01) |
| H04N 7/12 | (2006.01) |
| H04N 11/02 | (2006.01) |
| H04N 11/04 | (2006.01) |
| H04N 19/86 | (2014.01) |

(Continued)

(52) U.S. Cl.
CPC ............ *H04N 19/86* (2014.11); *H04N 19/117* (2014.11); *H04N 19/139* (2014.11); *H04N 19/14* (2014.11); *H04N 19/159* (2014.11); *H04N 19/172* (2014.11); *H04N 19/174* (2014.11); *H04N 19/187* (2014.11); *H04N 19/30* (2014.11); *H04N 19/46* (2014.11); *H04N 19/61* (2014.11); *H04N 19/80* (2014.11)

(58) Field of Classification Search
CPC ..................... H04N 7/26888; H04N 7/26058; H04N 7/50; H04N 7/26244; H04N 7/26382
USPC .................................................... 375/240.29
See application file for complete search history.

(56) References Cited

U.S. PATENT DOCUMENTS

| | | |
|---|---|---|
| 6,160,503 A | 12/2000 | Andrews et al. |
| 7,050,504 B2 | 5/2006 | Joch et al. |

(Continued)

FOREIGN PATENT DOCUMENTS

| | | |
|---|---|---|
| EP | 1507415 A2 | 2/2005 |
| KR | 1020050009226 | 1/2005 |
| WO | 2004093330 A2 | 10/2004 |

OTHER PUBLICATIONS

P. List, A. Joch, J. Lainema, G. Bjontegaard and M. Karczewicz, "Adaptive deblocking filter," in IEEE Transactions on Circuits and Systems for Video Technology, vol. 13, No. 7, pp. 614-619, Jul. 2003.*

(Continued)

*Primary Examiner* — Mehrdad Dastouri
*Assistant Examiner* — Kristin Dobbs

(57) ABSTRACT

A method of generating a video sequence including setting a state of a deblocking control flag in a frame header of a frame to indicate that a deblocking parameter is presented for some but not all layers. A method of processing a received video sequence including determining a state of a deblocking control flag of a frame header and retrieving a deblocking parameter for some but not all layers. A scalable video system including a deblocking control circuit which sets a state of a deblocking control flag in a frame header to indicate that a deblocking parameter is presented for some but not all layers. A scalable video system including a deblocking control circuit which determines the state of a deblocking control flag in a frame header of a received video sequence and which retrieves a deblocking parameter for some but not all layers of the frame.

20 Claims, 7 Drawing Sheets

(51) Int. Cl.

| | |
|---|---|
| *H04N 19/139* | (2014.01) |
| *H04N 19/159* | (2014.01) |
| *H04N 19/172* | (2014.01) |
| *H04N 19/46* | (2014.01) |
| *H04N 19/30* | (2014.01) |
| *H04N 19/61* | (2014.01) |
| *H04N 19/117* | (2014.01) |
| *H04N 19/14* | (2014.01) |
| *H04N 19/174* | (2014.01) |
| *H04N 19/187* | (2014.01) |
| *H04N 19/80* | (2014.01) |

(56) References Cited

U.S. PATENT DOCUMENTS

| | | |
|---|---|---|
| 7,440,501 B2 | 10/2008 | Sun |
| 7,535,961 B2 | 5/2009 | Cho et al. |
| 9,001,899 B2 | 4/2015 | He |
| 2001/0020906 A1 | 9/2001 | Andrews et al. |
| 2003/0206587 A1 | 11/2003 | Gomila |
| 2004/0101059 A1 | 5/2004 | Joch et al. |
| 2005/0013363 A1 | 1/2005 | Cho et al. |
| 2006/0018386 A1 | 1/2006 | Bjontegaard |
| 2006/0098744 A1 | 5/2006 | Huang |
| 2006/0104349 A1 | 5/2006 | Joch et al. |
| 2006/0115002 A1 | 6/2006 | Kim et al. |
| 2006/0126962 A1 | 6/2006 | Sun |
| 2006/0146941 A1* | 7/2006 | Cha et al. ............... 375/240.29 |
| 2006/0165183 A1 | 7/2006 | Numajiri |
| 2006/0294171 A1* | 12/2006 | Bossen et al. ............... 708/300 |
| 2007/0081586 A1 | 4/2007 | Raveendran et al. |
| 2008/0069247 A1 | 3/2008 | He |
| 2008/0137752 A1 | 6/2008 | He |
| 2008/0137753 A1 | 6/2008 | He |
| 2009/0074070 A1* | 3/2009 | Yin et al. ............... 375/240.16 |
| 2015/0181211 A1 | 6/2015 | He |

OTHER PUBLICATIONS

International Search Report and Written Opinion for correlating PCT Patent Application No. PCT/US07/71559 dated Sep. 5, 2008.
Definitions, separately. Dictionary.com. Dictionary.com Unabridged (v1.1). Random House, Inc. http://dictionary.reference.com/browse/separately.
Definitions, separately. Dictionary.com. The American Heritage® Dictionary of the English Language, Fourth Edition. Houghton Mifflin Company, 2004. http://dictionary.reference.com/browse/separately.
Wiegand, Thomas et al. "Draft ITU-T Recommendation and Final Draft International Standard of Joint Video Specification (ITU-T Rec.H264 |ISO/IEC 14496-10 AVC)" 7th Meeting: Pattaya, Thailand, Mar. 7-14, 2003; pp. 61, and 138-147.
Sheng, Bin et al. "An Implemented Architecture of Deblocking Filter for H.264/AVC." IEEE 2004 International Conference on Image Processing (ICIP). pp. 665-668.
Wiegand, Thomas. "Text of Final Committee Draft of Joint Video Specification (ITU-T Rec. H.264 | ISO/IEC 14496-10 AVC." Jul. 2002, Klagenfurt, AT. pp. 37-39, 73-81.
Marek Domanski, Lukasz Blaszak, Slawomir Mackowiak, AVC Video Coders with Spatial and Temporal Scalability, Poznan University of Technology, Institute of Electronics and Telecommunication, Poznan, Poland.
Giovanni Ramponi, Warped Distance for Space-Variant Linear Image Interpolation, IEEE Transactions on Image Processing, vol. 8, No. 5, May 1999.
Stephen K. Park, and Robert A Schowengerdt, Image Reconstruction by Parametric Cubic Convolution, Office of Arid Lands Studies and Electrical Engineering Department, University of Arizona, Received May 21, 1982.
Trac D Tran, Lijie Liu and Pankaj Topiwala; High-Performance Low-Complexity Re-sampling Filters for SVC; Joint Video Team (JVT) of ISO/IEC MPEG & ITU-T VCEG; 20th Meeting: Klagenfurt, Austria, Jul. 15- Jul. 21, 2006; pp. 1-8.
Shijun Sun; Texture Upsampling with 4-tap Cubic-Spline Filter; Joint Video Team (JVT) of ISO/IEC MPEG & ITU-T VCEG; 20th Meeting: Klagenfurt, Austria, Jul. 15-Jul. 21, 2006; pp. 1-8.
Puri A., et al "Video coding using the H.264/MPEG-4 AVC compression standard", Signal Processing. Image Communication. Elsevier Science Publisher, Amsterdam, NL. vol. 19, No. 9 pp. 793-849.
He, J. Etal "Disabling SVC Chroma Deblocking".21. JVT Meeting 78. MPEG Meeting; Oct. 20, 2006-Oct. 27, 2006. Hangzhou, CN; No. JVT-U020, Oct. 16, 2006.
He, Z., "Simplified H.264/AVC Deblocking Filter for SVC ENH Layer." 23, JVT Meeting. 80. MPEG Meeting. Apr. 21, 2007-Apr. 27, 2007. San Jose CR., US. No. JVT-WO69 Apr. 19, 2007.
Non-final office action dated Aug. 23, 2011 in U.S. Appl. No. 11/608,616.
Final office action dated Feb. 17, 2012 in U.S. Appl. No. 11/608,616.
Notice of Allowance dated Jun. 22, 2016 in U.S. Appl. No. 11/608,616.

\* cited by examiner

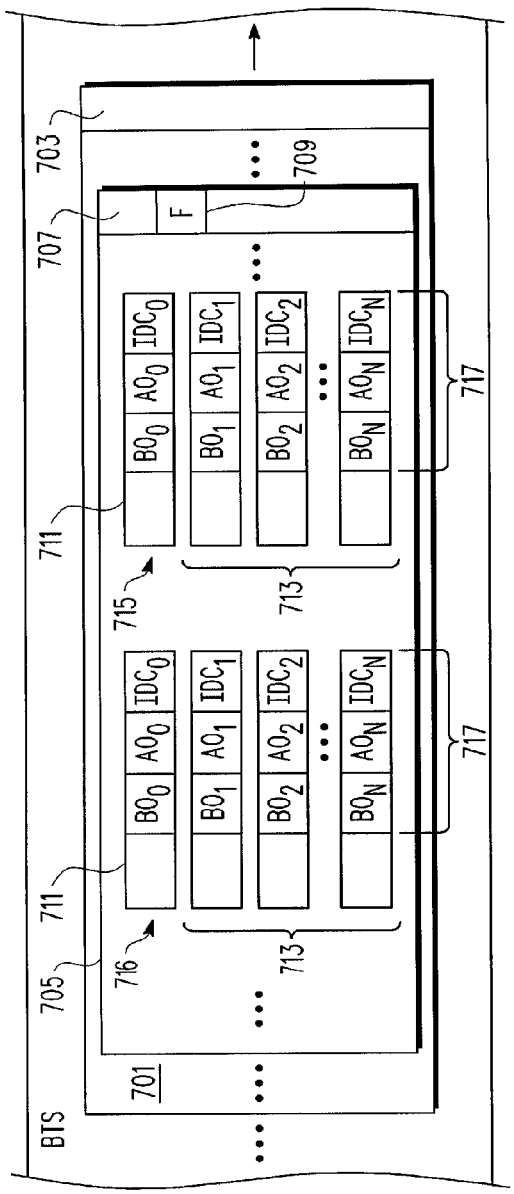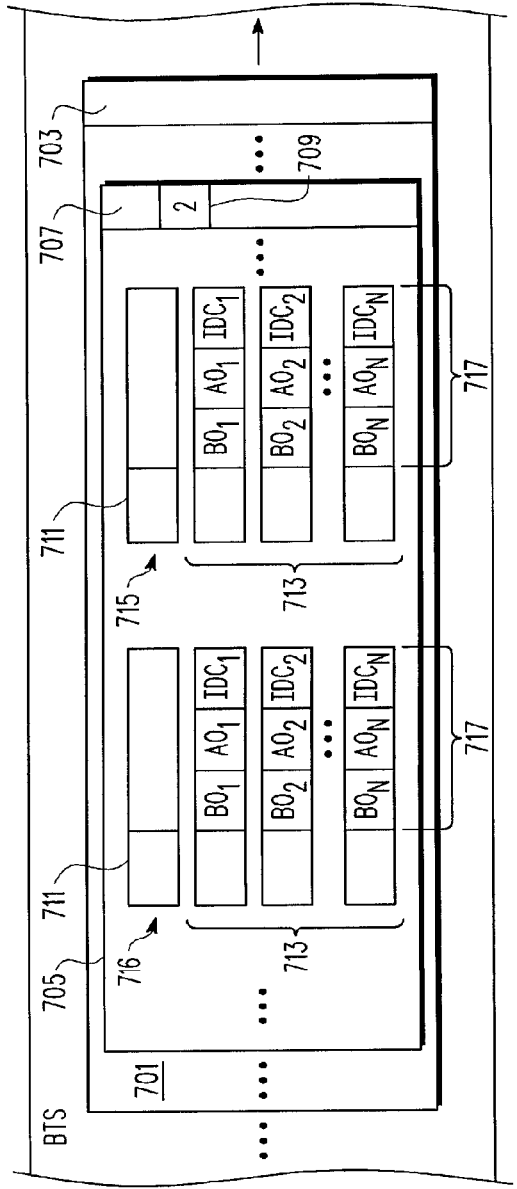

SYSTEM AND METHOD OF DETERMINING DEBLOCKING CONTROL FLAG OF SCALABLE VIDEO SYSTEM FOR INDICATING PRESENTATION OF DEBLOCKING PARAMETERS FOR MULTIPLE LAYERS

BACKGROUND OF THE INVENTION

1. Field of the Invention

The present invention relates in general to video information processing, and more specifically to a system and method of determining a deblocking control flag of scalable video system for indicating presentation of deblocking parameters for multiple layers for reducing bits in the bitstream.

2. Description of the Related Art

The Advanced Video Coding (AVC) standard, Part 10 of MPEG4 (Motion Picture Experts Group), otherwise known as H.264, includes advanced compression techniques that were developed to enable transmission of video signals at a lower bit rate or storage of video signals using less storage space. The newer standard outperforms video compression techniques of prior standards in order to support higher quality streaming video at lower bit-rates and to enable internet-based video and wireless applications and the like. The standard does not define the CODEC (encoder/decoder pair) but instead defines the syntax of the encoded video bitstream along with a method of decoding the bitstream. Each video frame is subdivided and encoded at the macroblock (MB) level, where each MB is a 16×16 block of pixels. Each MB is encoded in 'intraframe' mode in which a prediction MB is formed based on reconstructed MBs in the current frame, or 'interframe' mode in which a prediction MB is formed based on the MBs of the reference frames. The intraframe coding mode applies spatial information within the current frame in which the prediction MB is formed from samples in the current frame that have previously encoded, decoded and reconstructed. The interframe coding mode utilizes temporal information from previous and/or future reference frames to estimate motion to form the prediction MB. The video information is typically processed and transmitted in slices, in which each video slice incorporates one or more macroblocks.

Scalable Video Coding (SVC) is an extension of the H.264 standard which addresses coding schemes for reliably delivery of video to diverse clients over heterogeneous networks using available system resources, particularly in scenarios where the downstream client capabilities, system resources, and network conditions are not known in advance, or dynamically changing from time to time. SVC provides multiple levels or layers of scalability including temporal scalability, spatial scalability, complexity scalability and quality scalability. Temporal scalability generally refers to the number of frames per second (fps) of the video stream, such as 7.5 fps, 15 fps, 30 fps, etc. Spatial scalability refers to the resolution of each frame, such as common interface format (CIF) with 352 by 288 pixels per frame, or quarter CIF (QCIF) with 176 by 144 pixels per frame, although other spatial resolutions are contemplated, such as 4CIF, QVGA, VGA, SVGA, D1, HDTV, etc. Complexity scalability generally refers to the various computational capabilities and processing power of the devices processing the video information. Quality scalability generally refers to the visual quality layers of the coded video by using different bitrates. Objectively, visual quality is measured with a peak signal-to-noise (PSNR) metric defining the relative quality of a reconstructed image compared with an original image.

A deblocking filter is a formative part of the H.264 standard and SVC extension, and an informative part (as a post processing block) of the earlier H.263 standard and MPEG4-Part2. The deblocking filter performs both luma and chroma filtering as known by those of ordinary skill in the art. The deblocking filter is used either as an in-loop filter as part of the standard (e.g., H.264/AVC), or as a post-processor for video decoder (e.g., H.263, MPEG4-part2, MPEG-2, etc.). The deblocking filter enhances the decoded picture quality and increases the encoding efficiency by removing the block effects in the boundary of each 4×4, 8×8, and/or 16×16 block. The deblocking filter, however, also consumes a significant amount of power and processing cycles. Generally speaking, the entire deblocking filter (both luma and chroma) consumes approximately 8% of the computations at the encoder and approximately 35% at the decoder for H.264/AVC. Disabling the entire deblocking filter, therefore, provides a significant reduction of power and processing complexity, especially in the decoder. A conventional configuration according to H.264/AVC includes the ability to turn on and off the entire deblocking filter (including both luma and chroma deblock filtering). Disabling the entire deblocking filter, however, potentially causes degradation of both objective PSNR and subjective visual quality especially for video information having a relatively high level of motion. In most conventional configurations, therefore, the ability to completely disable the deblocking filter has not been used.

The bitstream carrying the video sequence generated and transmitted by an SVC video encoder is organized into multiple frames in which each frame includes multiple slices. Each frame header includes a frame header and the slices of the frame include base layer slices and enhanced layer slices, where each slice includes a slice header. The frame header includes a deblocking control flag indicating whether deblocking parameters are presented within the slice headers of the base layer slices and the enhanced layer slices. The deblocking parameters determine whether deblock filtering is enabled or disabled and additional deblocking settings when enabled. A deblocking enable/disable parameter is set to "0" to enable deblock filtering and to "1" to disable deblock filtering.

In conventional SVC configurations, the deblocking control flag is limited to the values "0" and "1", in which "0" indicates that deblocking parameters are not presented for any layers and "1" in which deblocking parameters are presented for all layers. If the deblocking control flag is "1", then deblock filtering may be disabled for the base layer (by setting the deblocking enable/disable parameter for the base layer to "1") or may be disabled for the enhanced layers to reduce processing cycles and/or power consumption. If deblock filtering is not needed for the base layer but is needed for the enhanced layer or if needed at the base layer but not the enhanced layers, then the deblocking control flag must be set to "1" at the expense of additional bits in the bitstream. The additional bits for the deblocking parameters had to be presented even if deblocking is not to be disabled and could otherwise be set to the default value of "0". The deblocking control flag could be set to "0" to reduce the bits in the bitstream since the deblocking parameters are not presented in the slice headers, yet this is at the expense of additional processing cycles and/or power consumption required for deblock filtering. The conventional syntax thus wastes bits in the bitstream.

It is desired to reduce the number of bits in the bitstream by allowing the encoder designer the option of not having to present deblocking parameters for either the base layer slices or the enhanced layer slices while disabling deblock filtering of at least one layer.

BRIEF DESCRIPTION OF THE DRAWINGS

The benefits, features, and advantages of the present invention will become better understood with regard to the following description, and accompanying drawings where:

FIG. 7 is a block diagram depicting deblocking filter control information provided in an output bitstream BTS from the SVC video encoder of FIG. 6 or provided in an input bitstream BTS to the video decoder of FIG. 6 according to an exemplary embodiment;

FIG. 8 is a block diagram depicting deblocking filter control information provided in the bitstream BTS substantially identical to that shown in FIG. 7 except illustrating a specific case of the deblocking filter control present flag;

DETAILED DESCRIPTION

The following description is presented to enable one of ordinary skill in the art to make and use the present invention as provided within the context of a particular application and its requirements. Various modifications to the preferred embodiment will, however, be apparent to one skilled in the art, and the general principles defined herein may be applied to other embodiments. Therefore, the present invention is not intended to be limited to the particular embodiments shown and described herein, but is to be accorded the widest scope consistent with the principles and novel features herein disclosed.

The present disclosure describes video information processing systems according to exemplary embodiments of the present invention. It is intended, however, that the present disclosure apply more generally to any of various types of "video information" including video sequences (e.g. MPEG), image information, or image sequencing information, such as, for example, JPEG (Joint Photographic Experts Group), motion JPEG (MJPEG), JPEG2000, motion JPEG2000 (MJPEG2000), etc. The term "video information" as used herein is intended to apply to any video or image or image sequence information.

Figure 1:
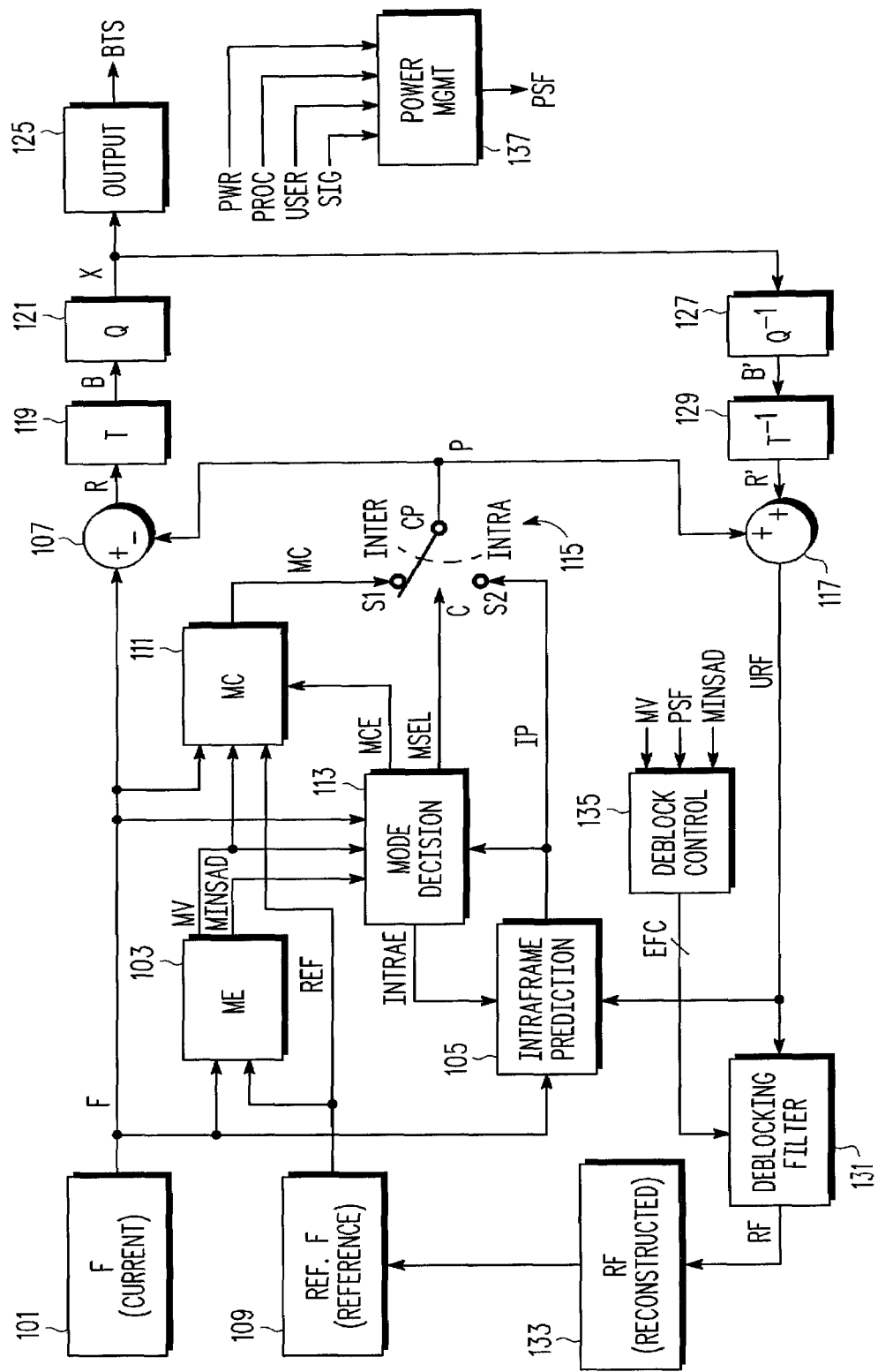
FIG. 1 is a block diagram of a video encoder implemented according to an exemplary embodiment for generating and transmitting video information in a bitstream (BTS)

FIG. 1 is a block diagram of a video encoder 100 implemented according to an exemplary embodiment for generating and transmitting video information in a bitstream (BTS). A frame buffer 101 provides, for purposes of encoding, current frame information F to one input of a motion estimation (ME) circuit 103, to one input of an intraframe prediction circuit 105, to a positive input of a combiner 107 (e.g., adder or subtractor or the like), to one input of a motion compensation (MC) circuit 111, and to an input of a mode decision circuit 113. Another frame buffer 109 provides reference information (REF) to another input of the ME circuit 103 and to another input of the MC circuit 111. The encoder 100 is typically configured to process information one macroblock at a time, so that the frame information F is usually processed one macroblock at a time, although alternative configurations are contemplated. The reference information REF includes information from one or more previously encoded and decoded frames that have further been filtered, such as by a deblocking filter 131.

The ME circuit 103 provides motion estimation information at its output, which is provided to another input of the MC circuit 111 and to another input of the mode decision circuit 113. As shown, the ME circuit 103 provides motion vector (MV) information to the MC circuit 111 and to the mode decision circuit 113, and the ME circuit 103 provides minimum sum of absolute differences (MINSAD) information to the mode decision circuit 113. The mode decision circuit 113 has one output providing an intraframe enable signal INTRAE to an enable input of the intraframe prediction circuit 105, and another output providing a motion compensation enable signal MCE to an enable input of the MC circuit 111. The MC circuit 111 provides motion compensated prediction information (e.g., interframe prediction) MC to a first input terminal S1 of a selector switch 115, illustrated as a single-pole, double-throw (SPDT) switch having input terminals S1 and S2, control input terminal C and a common terminal CP. The common terminal CP provides information from a selected input (S1 or S2) as its output as controlled by the control input terminal C. The intraframe prediction circuit 105 provides intraframe prediction information (e.g., intraframe prediction) IP to an input of the mode decision circuit 113 and to the input terminal S2 of the switch 115. The mode decision circuit 113 provides a mode decision select signal MSEL to the control terminal C of the switch 115 for selecting between the motion compensated prediction information MC or the intraframe prediction information IP.

The CP terminal of the switch 115 provides selected prediction information P to a negative input of the combiner 107 and to a positive input of another combiner 117, which is an adder in the illustrated embodiment. The combiner 107 subtracts the selected prediction information P from the current information F of a current frame to provide residual information R to the input of a transform circuit 119. The transform circuit 119 performs a block transform, such as discrete cosine transform (DCT) or the like, and outputs the transform result B. The transform result B is provided to a quantization (Q) circuit 121, which outputs quantized transform coefficients X. The X coefficients are provided to the input of an output processing circuit 125, which provides a compressed bitstream (BTS) for transmission or storage. The output processing circuit 125 performs additional functions for converting the X coefficients into the bitstream BTS, such as scanning, reordering, entropy encoding, etc., as known to those skilled in the art.

The X coefficients are fed back to the input of an inverse quantization ($Q^{-1}$) circuit 127, which outputs estimated transformed information B' representing an estimated or reconstructed version of the transform result B. The estimated transformed information B' is provided to the input of an inverse transform ($T^{-1}$) circuit 129, which outputs estimated residual information R' representing a reconstructed version of the residual information R. The reconstructed residual information R' is provided to another positive input of the combiner 117. In the embodiment shown, the combiner 117 adds P to R' to generate unfiltered reconstructed information URF. The unfiltered reconstructed frame information URF is provided to another input of the intraframe prediction circuit 105 and to an input of the deblocking filter 131. The deblocking filter 131, when enabled, filters the unfiltered reconstructed frame information URF and provides filtered reconstructed information RF to an RF buffer 133. One or two previously encoded and decoded frames from the RF buffer 133 are provided to the frame storage 109 to serve as the reference frame information REF as previously described.

A deblock control circuit 135 provides an encoder filter control (EFC) signal to the deblocking filter 131. In one embodiment, the deblocking filter 131 is turned completely on or completely off (or otherwise fully enabled or disabled) by the EFC signal. If the deblocking filter 131 is turned off or fully disabled, then the unfiltered reconstructed frame information URF is passed as the reconstructed information RF in which deblock filtering is bypassed (i.e., RF is the same as URF). In another embodiment, the EFC signal is configured to partially disable the deblocking filter 131 so that it only performs luma or chroma deblock filtering. The EFC signal may be a single binary signal or bit if only enabling or disabling luma or chroma deblock filtering. Alternatively, the EFC signal includes multiple signals or bits for selecting between fully enabled, fully disabled, or for disabling either one of luma and chroma deblock filtering.

Disabling the entire deblocking filter 131 provides a significant reduction of computational complexity and power consumption, especially in the decoder of a video processing system. Disabling the entire deblocking filter, however, potentially causes degradation of both objective PSNR and subjective visual quality especially for a relatively high level of motion in the video information. As described herein, the content of the video information is examined to determine whether to disable the deblock filtering. The content of the video information is examined to determine a characteristic indicative of a relative amount of content complexity and/or a relative amount of motion of the video information. If the video information content exhibits a relatively low amount of motion or is relatively simple content (e.g., not complex), then the deblocking filter 131 may be fully disabled without significant degradation in visual quality. Simulation results have revealed that disabling luma deblocking filter alone (while enabling the chroma deblocking filter) normally causes a relatively large degradation in both objective PSNR and subjective visual quality especially for video with a relatively large level of motion. The luma deblocking filter is particularly useful for low bit rate video applications or video having a relatively high compression ratio. The simulation results have also revealed, however, that disabling the chroma deblocking filter alone (while enabling the luma deblocking filter) results in a relatively small or negligible degradation in both objective and subjective visual quality. In various embodiments, the content characteristic is the content complexity or level of motion, which is compared with a threshold for enabling or disabling the entire deblocking filter 131. In another embodiment, separate thresholds are provided for luma and chroma deblock filtering.

The ME circuit 103 performs a motion search and determines a MINSAD value for each macroblock of each slice of the current frame or picture. In particular, the absolute values of the differences between each pixel value of the current macroblock of the current frame being encoded and the corresponding pixel value of a search macroblock in the reference frame are added together to determine a corresponding SAD value. This calculation is repeated for each reference search macroblock in the search window (according to the selected motion search pattern) and the lowest or lease SAD value is determined as the minimum SAD or MINSAD value. The reference search macroblock corresponding to the MINSAD value is used for determining the motion vector (MV) information. Each MINSAD value is provided from the ME circuit 103 to the deblock control circuit 135 for the purpose of measuring the relative complexity of the video content. As described further below, in one embodiment multiple MINSAD values are averaged for determining a complexity value or complexity factor of the video information. Other methods may be used to determine the relative complexity of the content of video information, such as mean square error, a number of bits used for coding the video information of a slice/picture, statistics of an individual frame or picture, etc. The mean square error may also be determined by the ME circuit 103 in which each pixel difference is squared and multiple squared values (for each macroblock or each slice, etc.) are summed together. Calculating each MINSAD value is less computationally complex than calculating the mean square error and an average of MINSAD values provides a sufficiently accurate measure of content complexity. In an alternative embodiment, the amount of motion is determined by the motion vectors, which are also shown provided to the deblock control circuit 135. Although the deblock control circuit 135 may utilize multiple content characteristics of the video information, such as, for example, both MV and MINSAD information, usually one characteristic is selected for particular configurations to reduce computational complexity.

In one embodiment, the deblock control circuit 135 determines an average of MINSAD values of a group or block of previously encoded information. The group or block of previously encoded information is usually a slice (one or more macroblocks) or a frame of encoded information. The determined average of MINSAD values is referred to as a MINSADAVG value. A relatively small MINSADAVG value suggests less change within a frame or between frames and thus suggests relatively simple video content. On the other hand, a relatively high MINSADAVG value suggests relatively complex video content. In certain embodiments, the MINSADAVG value is the average MINSAD value of the previously encoded frame. In one embodiment, for example, the deblock control circuit 135 maintains a running average of MINSAD values for each video frame and stores the average of MINSAD values of the previous frame as the MINSADAVG value. In other embodiments, the MINSADAVG value is the average MINSAD value of a corresponding video slice within the previously encoded frame. A video slice incorporates one or more macroblocks, and a "corresponding" video slice is the video slice of the previous frame that is in the same relative position of the current video slice of the frame currently being encoded. In one embodiment, for example, the deblock control circuit 135 maintains a running average of MINSAD values for each video slice and stores an average MINSAD value for each slice of the previously encoded frame to provide multiple MINSADAVG values per video frame. In still other embodiments, the MINSADAVG value is the average MINSAD value of a previously encoded video slice within the current frame. In one embodiment, for example, the deblock control circuit 135 maintains a running average of MINSAD values for each video slice being encoded in the current frame and stores an average of MINSAD values as the MINSADAVG value for the previously encoded video slice of the current frame. In this latter embodiment, the MINSADAVG value used for the first video slice (in which there is no previous slice in the current frame) is either the MINSADAVG value of the last encoded video slice of the previous frame or the average of MINSAD values of the entire previous frame.

The video encoder 100 includes a power management circuit 137, which monitors a variety of power-related factors and provides a power saving factor (PSF) based on the monitored factors. The monitored factors include, for example, power level or available power (e.g., battery level) via a power metric PWR, available processing resources via a processing metric PROC, a signal strength metric SIG indicating the signal strength of the bitstream BTS transmitted in a channel (e.g., see exemplary channel 602 of FIG. 6), and one or more user settings collectively indicated by a user metric USER. The USER metric may incorporate manual settings or adjustments made by the user or other manual or automatic power settings. The PSF is provided to the deblock control circuit 135. In one embodiment, the deblock control circuit 135 uses the PSF and the MINSADAVG values to control the state of the deblocking filter 131 via the EFC signal as further described below. In one embodiment, the PSF signal ranges from zero (0) to sixteen (16), in which PSF=0 indicates maximum available power and processing resources such that sufficient energy and processing power are deemed to be available for full deblock filtering. As PSF increases, it is desired to conserve power consumption and processing cycles as much as possible, such as by disabling at least a portion of deblock filtering.

Figure 2:
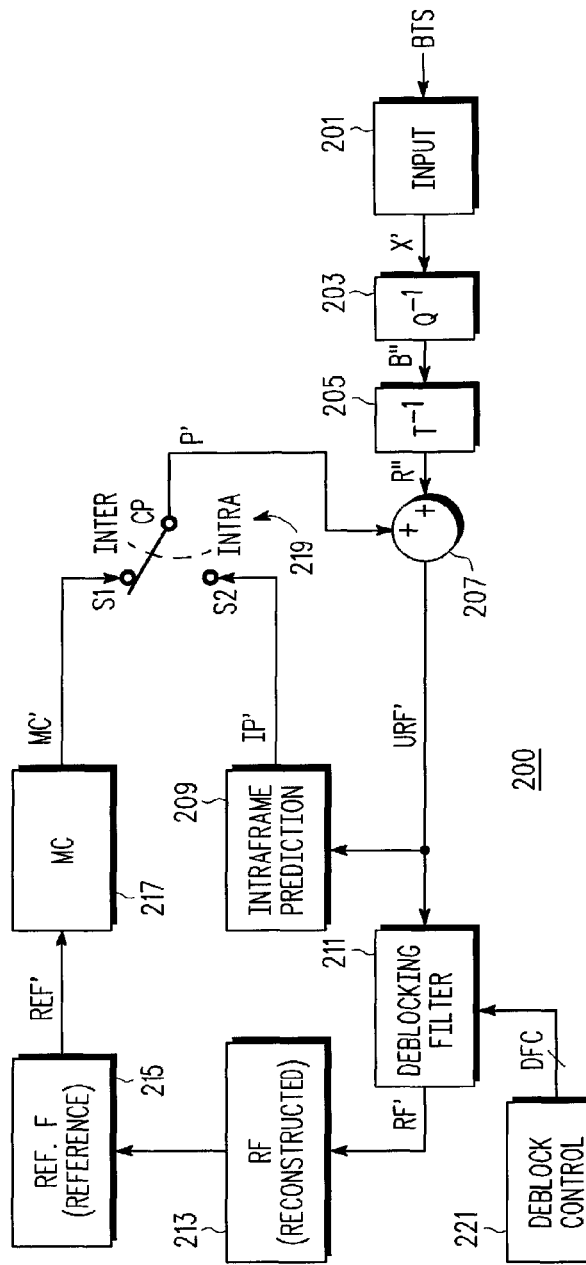
FIG. 2 is a block diagram of a video decoder implemented according to an exemplary embodiment for receiving and decoding video information incorporated into a bitstream BTS.

FIG. 2 is a block diagram of a video decoder 200 implemented according to an exemplary embodiment for receiving and decoding video information incorporated into a bitstream BTS. The video decoder 200 may be implemented in a different system (e.g., communicating with the video encoder 100) or may be incorporated into the same system as the video encoder 100 in which the encoder/decoder combination is used to communicate with similar type devices across the channel. The compressed bitstream BTS generated by the video encoder 100 is transmitted through the channel and provided to the input of an input processing circuit 201, which performs inverse processing functions of the output processing circuit 125 of the encoder 100, such as inverse scanning, reordering, entropy decoding, etc., as known to those skilled in the art. The input processing circuit 201 outputs quantized transform coefficients X' coefficients, which are intended to duplicate the X coefficients of the encoder 100. The X' coefficients are provided to the input of an inverse quantization circuit 203, which outputs estimated transformed information B'. The estimated transformed information B' is provided to the input of an inverse transform circuit 205, which outputs reconstructed residual information R' to a positive input of a combiner 207. In the embodiment shown, the combiner 207 adds selected prediction information P' to R' to generate unfiltered reconstructed information URF'. The unfiltered reconstructed frame information URF' is provided to an input of an intraframe prediction circuit 209 and to an input of a deblocking filter 211. The deblocking filter 211 filters the unfiltered reconstructed frame information URF' and provides filtered reconstructed information RF' to an RF buffer 213.

One or two previously encoded and decoded (and selectively filtered) frames from the RF buffer 213 are provided to a frame storage 215, which provides reference information REF' to the input of a motion compensation (MC) circuit 217. The MC circuit 217 provides motion compensated prediction information MC' to a first input terminal S1 of a selector switch 219, illustrated as a SPDT switch, having input terminals S1 and S2 and a common terminal CP providing a selected input as its output. The intraframe prediction circuit 209 provides intraframe prediction information IP' to the input terminal S2 of the switch 219. The switch 219 selects between the motion compensated prediction information MC' and the intraframe prediction information IP' and provides the selected prediction information P'. The input bitstream BTS provides mode information for controlling the switch 219 for selecting between interframe and intraframe prediction information as known to those of ordinary skill in the art.

Similar to the video encoder 100, the video decoder 200 generally processes information one macroblock at a time. Also, the deblocking filter 211 is configured in a similar manner as the deblocking filter 131, and includes a similar decoder filter control DFC signal provided by a deblock control circuit 221. As with the deblocking filter 131, if the deblocking filter 211 is disabled, then the unfiltered reconstructed frame information URF' is passed as the "filtered" reconstructed information RF' in which deblock filtering is bypassed. In a similar manner as the EFC signal controlling the state of the deblocking filter 131, the DFC signal is asserted by the deblock control circuit 221 to either fully enable or disable the deblocking filter 211 in one embodiment or to separately enable and disable the luma and chroma deblocking filters in another embodiment. To ensure equivalency of data between the encoder 100 and the decoder 200, the video encoder 100 asserts control bits in the bitstream BTS received by the video decoder 200 to control the activation state of the deblocking filter 211 as further described below. In particular, the state of the deblocking filter 211 within the video decoder 200 is adaptively controlled to have the same state as the state of the deblocking filter 131 within the video encoder 100 for the same data to improve coding efficiency and confine error drifting. For example, if the deblock control circuit 135 of the video encoder 100 controls the EFC signal to adaptively disable deblock filtering for a particular slice or frame of URF information being processed in the video encoder 100, then the video encoder 100 provides control information within the bitstream BTS to cause the deblock control circuit 221 of the video decoder 200 to provide the DFC signal to adaptively disable deblock filtering for a corresponding slice or frame of URF' information being processed in the video decoder 200.

Figure 3:
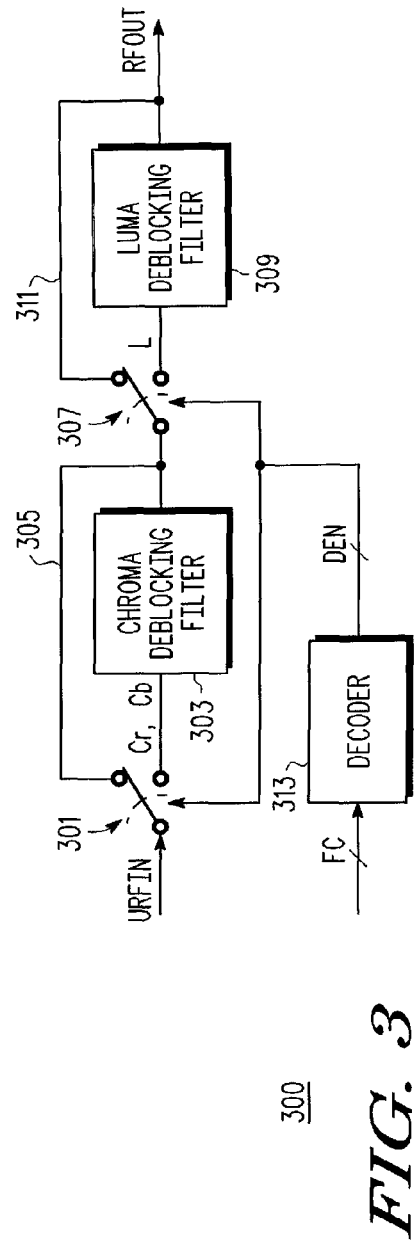
FIG. 3 is a simplified block diagram of a deblocking filter that may be used as either or both of the deblocking filters of the encoder of FIG. 1 and/or the decoder of FIG. 2.

FIG. 3 is a simplified block diagram of a deblocking filter 300 that may be used as either or both of the deblocking filters 131 and 211 according to an exemplary embodiment. Unfiltered reconstructed input (URFIN) information is provided to a first switch 301, where the URFIN information represents either the URF information of the video encoder 100 or the URF' information of the video decoder 200. The switch 301 is represented as another SPDT switch, although it is understood that it may be implemented in any suitable fashion, such as electronic switches or transistors or the like, or implemented in firmware or software or the like. When the switch 301 is in a first state or position, the chroma portion of the URFIN information, shown including a first chroma component (Cb) and a second chroma component (Cr), is provided to the input of a chroma deblocking filter 303. When the switch 301 is in a second state or position, the information bypasses the chroma deblocking filter 303 via path 305 and chroma deblock filtering is effectively disabled. As known by those of ordinary skill in the art, the Cb chroma component is a blue color luma difference and the Cr chroma component is a red color luma difference. The output of the chroma deblocking filter 303 and/or the path 305 are provided to another SPDT switch 307 configured in a similar manner as the switch 301. When the switch 307 is in a first state or position, a portion of the URFIN information, shown as luma information L, is provided to the input of a luma deblocking filter 309. When the switch 307 is in a second state or position, the information bypasses the luma deblocking filter 309 via path 311 and luma deblock filtering is disabled. The output of the luma deblocking filter 309 and the path 311 are shown providing filtered or unfiltered reconstructed output (RFOUT) information representing either the filtered or unfiltered reconstructed information RF of the video encoder 100 or the filtered reconstructed information RF' of the decoder 200.

The deblocking filter 300 includes a decoder 313 receiving a signal FC representing one of the EFC or DFC signals for the deblocking filter of a selected device (e.g., encoder or decoder). The decoder 313 outputs a deblock enable (DEN) signal to both control inputs of the switches 301 and 307. In this manner, the chroma and luma deblocking filters are enabled or disabled via the FC signal. When the DEN signal places both switches 301 and 307 in the first state, deblock filtering is completely enabled. When the DEN signal places both switches 301 and 307 in the second state, deblock filtering is completely disabled, such that RFOUT=URFIN. And the switches 301 and 307 may be placed in opposite states to disable either one of the chroma or luma deblocking filters 303 and 309 to achieve partial deblock filtering.

Figure 4:
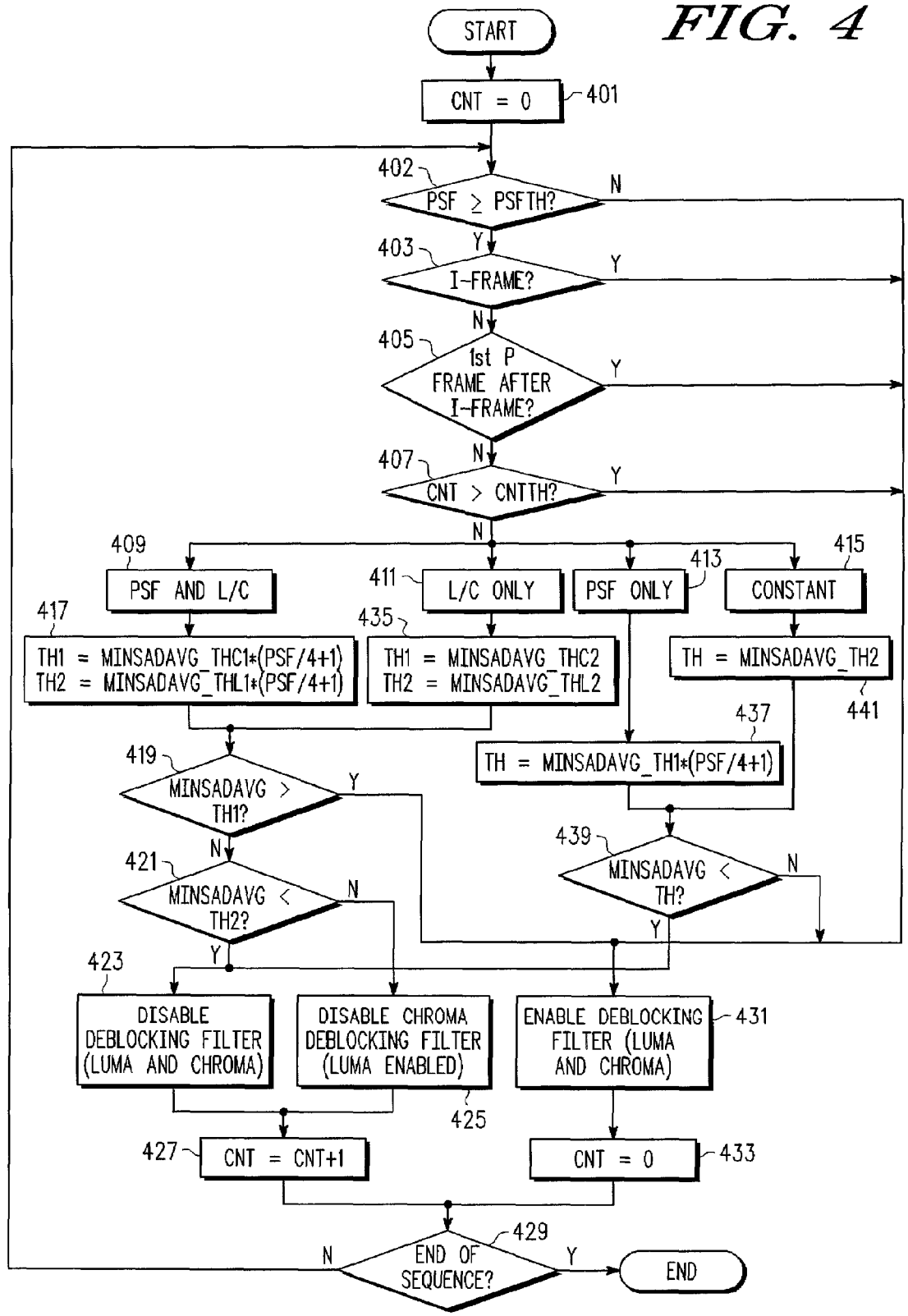
FIG. 4 is a flowchart diagram illustrating operation of the deblock control circuit of FIG. 1 implemented according to an exemplary embodiment for adaptively disabling deblock filtering based on content of the video information and also based on power savings considerations.

FIG. 4 is a flowchart diagram illustrating operation of the deblock control circuit 135 implemented according to an exemplary embodiment for adaptively disabling deblock filtering based on a content characteristic of the video information and also based on power savings considerations. At a first block 401, a count variable CNT is initially set equal to zero. The CNT value represents the number of slices or frames during which deblock filtering is disabled. At next block 402, it is queried whether PSF is greater than or equal to a predetermined threshold PSFTH. As described previously, PSF is based on several factors that are monitored, such as those indicative of available power, processing resources, channel signal strength, user settings, etc. In certain embodiments, PSF is used to determine whether to disabling of the any portion of deblock filtering is necessary or desirable. If PSF is sufficiently low (e.g., 0 or 1 on a scale of 0-16) indicating a sufficient amount of resources for deblock filtering, then it may be advantageous to fully enable deblock filtering to maximize visual quality. In certain embodiments, PSFTH is a fixed threshold value (e.g., in the range of 0-2), such as set during manufacturing or hardwiring or the like, and as soon as PSF reaches or exceeds the predetermined fixed value, the system allows deblock filtering to be partially or fully disabled. In alternative embodiments, PSFTH is a variable value which may be adjusted during system operation. If PSF is not greater than or equal to PSFTH as determined at block 402, then operation proceeds to block 431 in which deblock filtering remains fully enabled as further described below. The consideration of PSF may be bypassed by eliminating function block 402 or by setting PSFTH to the lowest possible value of the PSF range (e.g., by setting PSFTH=0) so that PSF would always be greater than or equal to PSFTH.

If PSF is greater than or equal to PSFTH as determined at block 402, operation proceeds to block 403 to query whether the current frame being encoded is an I-frame. An I-frame, otherwise referred to as an intraframe or keyframe, is a single frame that is independent of the frames that precede and that follow it and includes all of the data needed to display that frame. Typically, I-frames are interspersed with P-frames (predictive or predicted frame) and B-frames (bidirectional or bidirectional predictive frames) in a sequence of video frames or group of pictures (GOP). I-frames typically contain a greater amount of video information and are generally more important than other frame types for maintaining visual quality. In certain embodiments, it is desired that deblock filtering remain fully enabled for all I-frames and for every P-frame following an I-frame in the coding order (not necessarily the display order). If the current frame is an I-frame as determined at block 403, or if the frame is the first P-frame following an I-frame in coding order as determined at next block 405, then operation proceeds to block 431 in which deblock filtering is fully enabled. Otherwise, operation proceeds to block 407 to determine whether CNT is greater than a predetermined frame count threshold CNTTH. As further described below, the CNT value is incremented for each consecutive slice or frame during which deblock filtering is at least partially disabled. When deblock filtering is at least partially disabled, a certain amount of visual blocking effect is introduced or otherwise added. The blocking effect error increases over time with consecutive non-deblock filtered slices or frames. Thus CNT is indicative of a non-deblock filtering period during which deblock filtering is not fully enabled. CNT may represent a maximum number of consecutive frames allowed in which deblock filtering is disabled or a maximum number of consecutive frames (determined as the maximum number of consecutive frames times the number of slices per frame). If CNT exceeds CNTTH as determined at block 407, then operation proceeds to block 431 to fully enable deblock filtering.

If CNT has not yet exceeded CNTTH as determined at block 407, then operation proceeds to any one of several processing paths for adaptively disabling deblock filtering depending upon the particular configuration, where each path is indicated by a corresponding label 409, 411, 413 and 415. In each path, one or more thresholds are established for comparison with the MINSADAVG value determined by the deblock control circuit 135. The first path indicated by label 409 (PSF & L/C) is used when separate thresholds are calculated for chroma and luma (L/C) deblock filtering and when PSF is used to adjust the comparison thresholds. The second path indicated by label 411 (L/C ONLY) is used when separate thresholds are calculated for chroma and luma deblock filtering and when PSF is not used for calculating the thresholds. The third path indicated by label 413 (PSF ONLY) is used when a single threshold is calculated for deblock filtering and when PSF is used to adjust the single threshold. The fourth path indicated by label 415 (CONSTANT) is used when a single threshold is calculated for deblock filtering and when PSF is not used. In one embodiment, consideration of PSF is disabled by setting PSFTH to the lowest possible value (e.g., 0) and by disabling paths 409 and 413. If it is desired to use a single threshold to either fully enable or fully disable deblock filtering, then the paths 409 and 411 may be disabled.

If the first path of label 409 is employed, then operation proceeds from block 407 to block 417 in which a first threshold TH1 is set equal to MINSADAVG_THC1*(PSF/4+1) and a second threshold TH2 is set equal to MINSADAVG_THL1*(PSF/4+1) (in which an asterisk "*" denotes multiplication). In one exemplary embodiment, MINSADAVG_THC1 is a threshold value associated with chroma deblock filtering and MINSADAVG_THL1 is a threshold value associated with luma deblock filtering. In one embodiment, since luma deblock filtering has a greater impact for improving the visual quality of video information, the MINSADAVG_THC1 threshold is set significantly higher than the MINSADAVG_THL1 threshold increasing the likelihood that only chroma deblock filtering is disabled while luma deblock filtering remains enabled. In either case, the threshold values are further adjusted based on PSF. In the illustrated embodiment, the higher the value of PSF, the greater the threshold values TH1 and TH2. The higher the level of TH1, the greater the chance of disabling the chroma deblocking filter. The higher the level of TH2, the greater the chance of completely disabling deblock filtering.

After the thresholds TH1 and TH2 are determined at block 417, operation proceeds to block 419 in which it is queried whether MINSADAVG is greater than TH1. If MINSADAVG is not greater than TH1, then operation proceeds to block 421 to query whether MINSADAVG is less than TH2. If MINSADAVG is less than TH2, then operation proceeds to block 423 in which the deblocking filter is fully disabled for both luma and chroma. In this case, since TH2 is associated with a relatively low complexity level of the video content, fully disabling deblock filtering saves a significant amount of power and processing cycles without significantly degrading visual quality. If instead MINSADAVG is not less than TH2 as determined at block 421, so that MINSADAVG is less than or equal to TH1 and greater than TH2, operation proceeds instead to block 425 in which only the chroma deblocking filter is disabled (while the luma deblocking filter remains enabled). In this case for a low to medium level of content complexity, only the chroma deblocking filter is disabled to minimize impact of the visual quality of the video content. After either block 423 or 425, operation proceeds to block 427 in which CNT is incremented by one since at least a portion of deblock filtering is disabled. Operation then proceeds to block 429 to query whether the video sequence is completed or if additional slices or frames are in the video sequence to be encoded. If the video sequence is not completed, operation returns to block 402. Otherwise, operation is completed.

Referring back to block 419, if MINSADAVG is greater than TH1, then it is deemed that the video content is relatively complex and operation proceeds to block 431 in which deblock filtering is fully enabled, meaning both of the luma and chroma deblocking filters are enabled. From block 431, operation proceeds to block 433 in which the CNT value is set equal to zero. Since the CNT value represents the number of slices or frames during which deblock filtering is disabled, CNT is reset to zero at block 433 since deblock filtering is now fully enabled. Operation then proceeds to block 429 to query whether the video sequence is completed as described previously.

If the second path of label 411 is employed instead, then operation proceeds from block 407 to block 435 in which the first threshold TH1 is set equal to a threshold value MINSADAVG_THC2 and the second threshold TH2 is set equal to a threshold value MINSADAVG_THL2. In the same manner as with the path of label 409, in one exemplary embodiment, the threshold value MINSADAVG_THC2 is associated with chroma deblock filtering and the threshold value MINSADAVG_THL2 is associated with luma deblock filtering. And further, in one embodiment, since luma deblock filtering has a greater effect to improve the visual quality of video information, the MINSADAVG_THC2 threshold is typically higher than the MINSADAVG_THL2 threshold thus increasing the likelihood that only chroma deblock filtering is disabled while luma deblock filtering remains enabled. In this case, the thresholds are not further adjusted by PSF. The MINSADAVG_THC2 threshold may be the same as the MINSADAVG_THC1 threshold and the MINSADAVG_THL2 threshold may be the same as the MINSADAVG_THL1. Alternatively, the MINSADAVG_THC2 and MINSADAVG_THL2 thresholds may be different than (e.g., increased relative to) the respective MINSADAVG_THC1 and MINSADAVG_THL1 thresholds since PSF is not used to adjust the threshold values. After the threshold values TH1 and TH2 are determined at block 435, operation proceeds to block 419 to compare MINSADAVG with TH1 and TH2 in the same manner as described above for path with label 409.

If the third path of label 413 is employed instead, then operation proceeds from block 407 to block 437 in which a single threshold TH is set equal to MINSADAVG_TH1*(PSF/4+1). The single threshold value MINSADAVG_TH1 is chosen at a level of MINSADAVG in which it is desired to either completely enable or completely disable deblock filtering. In this case, the threshold MINSADAVG_TH1 is further adjusted by the PSF value in a similar manner as previously described. After the threshold TH is determined at block 437, operation proceeds to block 439 to determine whether MINSADAVG is less than TH. If so, then operation proceeds to block 423 in which deblock filtering is completely disabled. If not, then operation proceeds instead to block 431 in which deblock filtering is fully enabled. The threshold value MINSADAVG_TH1 may be the same as the threshold value MINSADAVG_THC1 or MINSADAVG_THC2 or may be adjusted (e.g., decreased) since luma and chroma deblock filtering are not considered separately.

If the fourth path of label 415 is employed instead, then operation proceeds from block 407 to block 441 in which the threshold TH is set equal to MINSADAVG_TH2. In a similar manner as described above, the single threshold value MINSADAVG_TH2 is chosen at a level of MINSADAVG in which it is desired to either completely enable or completely disable deblock filtering. In this case, however, the threshold MINSADAVG_TH2 is not further adjusted by the PSF value. After the threshold TH is determined at block 441, operation proceeds to block 439 to compare MINSADAVG with TH as previously described. The threshold value MINSADAVG_TH2 may be the same as MINSADAVG_TH1 (or the same as either MINSADAVG_THC1 or MINSADAVG_THC2) or may be adjusted based on the fact that PSF is not used for adjustment and luma and chroma deblock filtering are not considered separately in this case.

As previously noted, alternative methods may be used to measure or monitor a content characteristic of the video information for adaptively disabling deblock filtering. In the flowchart of FIG. 4, for example, each reference to the MINSADAVG value (in blocks 419, 421, 439) may be replaced with a corresponding mean square error value and the threshold values (e.g., MINSADAVG_THC1, MINSADAVG_THL1, etc.) are replaced with appropriate and corresponding mean square error thresholds. Alternatively, the MINSADAVG values may be replaced with corresponding MV values in which case corresponding MV thresholds are used. Operation is substantially similar in the various configurations. For example, multiple MV values may be averaged for each slice for determining the content characteristic. And furthermore, combinations of parameters may be used for determining the content characteristic, such as any combination of values of MINSADAVG, mean square error, MV, number of coding bits used for coding the video content of a frame or slice, etc. In general, at least one characteristic of the content of the video information is used to adaptively disable deblock filtering.

Figure 5:
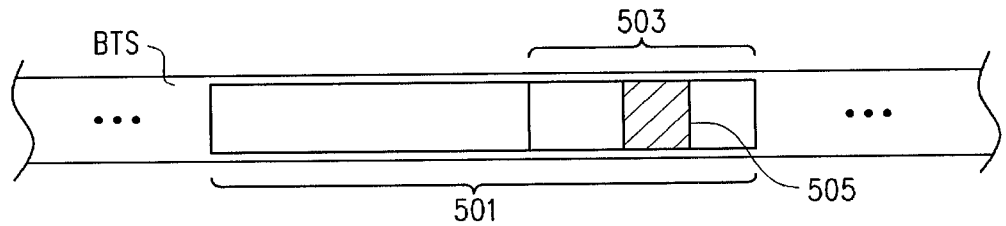
FIG. 5 is a block diagram depicting deblocking filter control information provided in the bitstream BTS output from the video encoder of FIG. 1 or provided to the video decoder of FIG. 2 according to an exemplary embodiment of a non-scalable configuration.

FIG. 5 is a block diagram depicting deblocking filter control information provided in the bitstream BTS output from the video encoder 100 or provided to the video decoder 200 (from the encoder 100 or another encoder not shown) according to an exemplary embodiment of a non-scalable configuration. The encoder 100 asserts the EFC signal to locally control the state of the deblocking filter 131 for particular video information being encoded. The encoder 100 generates the bitstream BTS including one or more slices of encoded information. Each slice includes one or more macroblocks of encoded information and includes a slice header. As shown, the bitstream BTS includes a slice 501 having a slice header 503. In the embodiment illustrated, the slice header 503 includes a deblocking filter control field 505 (shown shaded), which includes one or more deblocking filter control bits. It is noted that if the filter control field 505 is not present in the bitstream BTS provided to the decoder 200, then the decoder 200 uses a default configuration in which the deblocking filter 211 is fully enabled to perform both luma and chroma deblock filtering. In a conventional H.264 configuration, the deblocking filter control field 505 includes a parameter in the range of [0,2] for controlling the state of the deblocking filter of the decoder 200. The conventional parameter has a state of 0 to indicate that the deblocking filter 211 is to be fully enabled. A state of 1 indicates that the deblocking filter 211 is to be completely disabled, including both chroma and luma deblocking filters. A state of 2 indicates that the deblocking filter 211 is fully enabled except on slice boundaries. A state of 3 was previously undefined in conventional configurations and not used.

In certain embodiments, the undefined state of 3 is redefined to indicate disabling of the chroma deblocking filter (e.g., the chroma deblocking filter 303) while the luma deblocking filter (e.g., the luma deblocking filter 309) remains enabled within the deblocking filter 211. In another embodiment, a separate chroma deblocking control bit is added to the deblocking filter control field 505 of the slice header 503. The state of the chroma deblocking control bit determines the state of the chroma deblocking filter for the decoder 200. For example, the chroma deblocking control bit is negated low to enable chroma deblock filtering and asserted high to disable chroma deblock filtering, or vice-versa.

Figure 6:
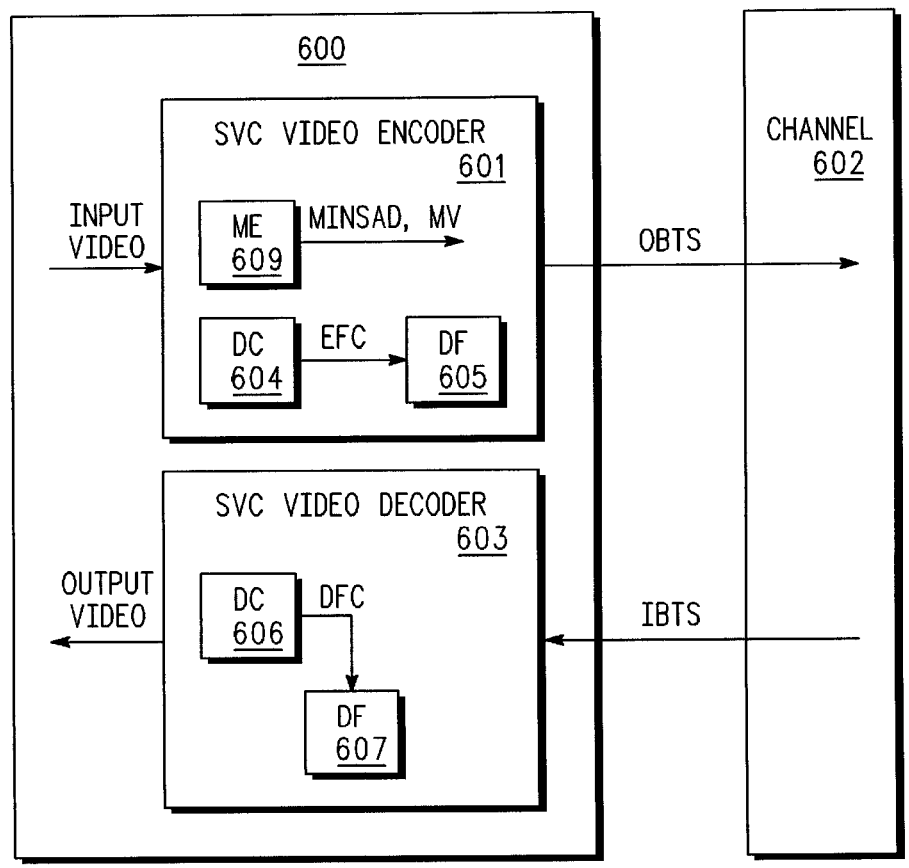
FIG. 6 is a simplified block diagram of an SVC video system implemented according to an exemplary embodiment including both an SVC video encoder and decoder.

FIG. 6 is a simplified block diagram of an SVC video system 600 implemented according to an exemplary embodiment. The SVC video system 600 includes an SVC video encoder 601 and an SVC video decoder 603 incorporated within the same system or unit. The video encoder 601 encodes input video and encapsulates the encoded video information into an output bitstream (IBTS) asserted onto a channel 602. An input BTS (IBTS) is provided via the channel 602 to the video decoder 603, which provides output video. The channel 602 may be any media or medium, and wireless communications are contemplated. The SVC encoder 601 includes similar coding and decoding components and functions as the video encoder 100 as understood by those skilled in the art, including a motion estimation (ME) component 609 generating and providing MINSAD and MV values. The SVC video system 600 further incorporates various layers of scalability, including temporal scalability, spatial scalability, complexity scalability and quality scalability. As previously described, temporal scalability generally refers to the number of frames per second (fps) of the video stream, such as 7.5 fps, 15 fps, 30 fps, etc. Spatial scalability refers to the resolution of each frame, such as CIF (352 by 288 pixels per frame), or QCIF (176 by 144 pixels per frame), although other spatial resolutions are contemplated, such as 4CIF, QVGA, VGA, SVGA, D1, HDTV, etc. Complexity scalability generally refers to the various computational capabilities and processing power of the devices processing the video information. Quality scalability generally refers to the visual quality layers of the coded video by using different bitrates. Objectively, visual quality is measured with the PSNR metric defining the relative quality of a reconstructed image compared with an original image.

As understood by those skilled in the art, the SVC video system 600 uses a selected transform function, such as the DCT algorithm or the like, and provides transform coefficients to a quantization circuit. The transform coefficients are scaled to integers and quantized into quantized transform coefficients signal by a quantization circuit, where the quantization step size is controlled by a quantization parameter (QP). The quantized transform coefficients scanned and then entropy coded. Entropy coding is according to any suitable type of entropy encoding such as Universal Variable Length Codes ("UVLC"), Context Adaptive Variable Length Codes ("CAVLC"), Context-based Adaptive Binary Arithmetic Coding ("CABAC"), or combinations thereof, or any other type of entropy encoding as known to those skilled in the art. The entropy coded information is provided to a data buffer for transmission. Quality scalability is achieved by adjusting the quantization parameter (QP), by selection of the entropy coding method, and/or by progressively entropy coding the bit-plane, to adjust the bitrate of the bitstream BTS. The SVC video system 600 further includes interpolator and filtering functions (not shown) as known to those skilled in the art to support multiple spatial layers to achieve spatial scalability.

The SVC video encoder 601 includes a deblock control (DC) circuit 604 providing an encoder filter control (EFC) signal to a deblocking filter (DF) 605 in a similar manner as previously described for the deblock control circuit 135 and the deblocking filter 131. The MINSAD values are received and processed by the deblock control circuit 604 in a similar manner described above for the deblock control circuit 135. The SVC video decoder 603 includes a deblock control circuit 606 providing a decoder filter control (DFC) signal to a deblocking filter 607 in a similar manner as previously described above for the deblock control circuit 221 and the deblocking filter 221. The deblocking filters 605 and 607 of the SVC video system 600, however, are configured to deblock multiple layers of video information. In one embodiment, each of the deblocking filters 605 and 607 incorporates multiple deblocking filters, one for each layer including a base layer and one or more enhanced layers. In an alternative embodiment, each of the deblocking filters 605 and 607 incorporates a single deblocking filter capable of deblock filtering the base and enhanced layers, in which deblock filtering is separately enabled for each layer. In either case, the EFC and DFC signals are configured to separately enable deblock filtering the base layer and each enhanced layer included in the particular implementation. It may be desired, for example, to deblock filter each slice of video information at the base layer and to disable deblock filtering at any one or more of the enhanced layers. Furthermore, as illustrated by the deblocking filter 300, it may be desired to disable one of chroma and luma deblock filtering at any one or more of the base and enhanced layers. If it is further desired to separately enable chroma and luma deblock filtering, the EFC and DFC signals are configured to separately enable chroma and luma deblock filtering at any one or more of the base and enhanced layers.

FIG. 7 is a block diagram depicting deblocking filter control information provided in an output bitstream BTS from the SVC video encoder 601 (e.g., OBTS), or provided in an input bitstream BTS (e.g., IBTS) to the video decoder 603 according to an exemplary embodiment. The bitstream BTS includes at least one video information sequence 701, which includes a sequence header 703 incorporating and describing the parameters used for the entire video sequence 701. The sequence header 703 contains, for example, a coding profile, a coding level, a picture width, a picture height, etc. Each sequence typically has only one sequence header. In SVC configurations, scalability information is also included. The video information sequence 701 further includes one or more video frames including an exemplary video frame 705 as illustrated. Each frame includes a frame header describing the parameters used for the entire video frame, such as entropy coding mode flag, slice group map type, an initial quantization parameter (QP) value, chroma QP index offset, a deblocking filter control present flag, etc. The video frame 705, for example, includes a frame header 707 at the front of the video frame 705 which further includes a deblocking filter control present flag 709, labeled "F".

Each video frame in the video information sequence 701, including the video frame 705, includes one or more slices, in which each slice incorporates one or more macroblocks for the frame. In a scalability configuration including quality scalability, each frame includes multiple layers including a base layer and one or more enhanced layers. As described herein, each slice is either a base layer slice or an enhanced layer slice. As shown, the video frame 705 includes multiple slices including base layer slices 711 and enhanced layer slices 713. The slices of the video frame 705 are shown in groups including a first group of slices 715 and a second group of slices 716, etc. Each of the illustrated groups of slices 715 and 716 includes a slice for each layer, including a base layer slice and an enhanced layer slice for each enhanced layer included in the frame. The illustrated groups of slices are not intended to described how the slices are actually organized within the bitstream BTS during transmission but only to illustrate corresponding or associated slices within each video frame for purposes of deblocking parameter determinations. As further described below, a complexity value is determined while coding each base layer slice 711 and that complexity value is used to determine the deblocking parameter for associated enhanced layer slices within a corresponding group. During transmission, the slices may be grouped or combined in any one of several different manners. For example, the base layer slices may be transmitted first followed by first enhanced layer slices which are followed by second enhanced layer slices and so on.

Each slice includes a slice header 717 which describes the parameters used for that video coding slice. Each slice header 717 includes the first macroblock position in the slice, the corresponding frame number, a delta QP parameter for the slice, one or more parameters for deblocking filter control, etc. As shown, for example, each slice header 717 includes deblocking filter control parameters, which may include a disable_deblocking_filter_idc parameter (or IDC) for that slice. As shown, the slice headers 717 include a first deblocking disable control parameter $IDC_0$ for each base layer slice, a second deblocking disable control parameter $IDC_1$ for each first enhanced layer slice, a third deblocking disable control parameter $IDC_2$ for a second enhanced layer slice, and so on up to a final deblocking disable control parameter $IDC_N$ for the last enhanced layer slice (for layers 0 to N for N+1 slice layers). Most practicable configurations only include one or two enhanced layers although N+1 layers are shown to illustrate that any number of layers are possible depending upon the particular implementation.

In one embodiment, each of the IDC deblocking disable control parameters has a value of "1" to disable deblock filtering for the corresponding layer and a value of "0" to enable deblock filtering for that layer. Additional values may be defined for more complex configurations, such as for separate enable and disable of chroma and luma deblocking filters per layer as previously illustrated by the deblocking filter 300. In the illustrated embodiment, the IDC deblocking disable control parameters are defined for fully enabling or disabling deblock filtering. The IDC deblocking disable control parameters are optionally presented with each slice header depending upon the state of the deblocking filter control present flag 709 in the frame header. If the deblocking filter control present flag 709 in the frame header 707 of the video frame 705 has a value of "0", then the IDC deblocking disable control parameters (e.g., $IDC_0$, $IDC_1$, $IDC_2$, . . . , $IDC_N$) are not presented in the slice headers 717 of any of the slices. Instead, all of the IDC deblocking disable control parameters are assumed to have a default value of "0" to enable deblock filtering for each layer. If the deblocking filter control present flag 709 in the frame header 707 of the video frame 705 has a value of "1", then the IDC deblocking disable control parameters are presented in the slice headers 717 of each of the slices, so that each IDC deblocking disable control parameter is examined to determine whether to enable or disable deblock filtering for the corresponding layer.

The number of bits in the bitstream BTS may be reduced by setting the deblocking filter control present flag 709 to "0" since all of the IDC deblocking disable control parameters are eliminated in each slice header 717 of the video frame 701. Deblock filtering, however, is performed by the deblocking filter 605 of the SVC video encoder 601 or by the deblocking filter 607 of the SVC video decoder 603, thereby consuming considerable processing cycles and power. If it is desired to reduce power consumption and/or processing cycles, then the deblocking filter control present flag 709 may be set to "1", so that all of the IDC deblocking disable control parameters must be presented in each slice header 717 of the video frame 701. Although deblock filtering may be separately enabled or disabled for each layer of each slice group, the number of bits of the bitstream BTS is increased by a certain amount.

In conventional SVC configurations, the deblocking filter control present flag 709 is limited to the values "0" and "1" so that the options were limited to reducing processing cycles and/or power consumption at the expense of additional bits in the bitstream BTS or by reducing bits in the bitstream BTS at the expense of additional processing cycles and/or power consumption. The conventional syntax thus wastes bits in the bitstream BTS. For example, if the base layer slice of quality scalability coding system needs deblock filtering with the default deblocking parameter "0" while none of the enhanced layer slices requires deblock filtering in order to reduce computational complexity, then the deblocking filter control present flag 709 has to be set to "1" since each of the IDC deblocking disable control parameters has to be presented with the value "1" to disable deblock filtering at the enhanced layer slices. Since the deblocking filter control present flag 709 equals "1", the IDC deblocking disable control parameter $IDC_0$ for the base layer slice must also be presented even though it has a default value of "0". Therefore, bits are wasted to present the default "0" value for the IDC deblocking disable control parameter $IDC_0$.

The problem was made worse by the fact that the actual conventional syntax includes three deblock filtering parameters at the slice level as understood by those skilled in the art. The IDC deblocking disable control parameter is used to enable or disable the deblocking filter for a given slice layer, having a default value of "0" for enable and "1" for disable. A slice_alpha_c0_offset_div2 parameter is used to adjust an "alpha" value for filtering. The default value for this parameter is "0". The alpha offset parameters are shown in the slice headers as $AO_0, AO_1, AO_2, \ldots, AO_N$ for the N+1 slices of each slice group. The nonzero alpha offset (in the range of [−6,+6]) provides the encoder designer with the ability to optimize the subjective quality of the decoded video beyond that provided by use of the default tables. For example, reducing the amount of filtering by transmitting negative offset can help to maintain the sharpness of small spatial details, particularly with high-resolution video content, in which small blocking artifacts tend to be less apparent. On the other hand, using positive offsets to increase the amount of filtering can improve subjective quality on content where visible blocking artifacts remain if the default values are used. This is beneficial for lower resolution content with smooth brightness transitions and to remove additional artifacts that might be introduced by sub-optimal motion estimation, mode decision, or residual coding. A slice_beta_offset_div2 parameter is used to adjust a "beta" value for filtering in a substantially similar manner as the alpha value described above. Again, the default value for beta is "0". The beta offset parameters are shown in the slice headers as $BO_0, BO_1, BO_2, \ldots, BO_N$ for the N+1 slices of each slice group. In this manner, the number of bits actually wasted depends on the number of slice groups in the frame. For example, for a QCIF configuration at 15 fps video at 64 kbps and with a video packet size (or slice size) of 300 bits, the number of slices (or packets) in a frame is 14.2 (calculated as [64000/15]/300=14.2). The three deblocking parameters each having a default value of "0" requires 3 bits. Thus, the total number of bits wasted in a frame is 30/300 or 1%).

The semantic of the deblocking filter control present flag 709 is extended according to an exemplary embodiment to reduce the waste of bits in the bitstream BTS. The following Table 1 is an exemplary semantic configuration of the deblocking filter control present flag 709 according to one embodiment:

TABLE 1

Extended Semantics For Deblocking Filter Control Present Flag 709

| FLAG VALUE | DESCRIPTION |
|---|---|
| 0 | DEBLOCKING PARAMETERS ARE NOT PRESENTED FOR BOTH BASE AND ENHANCED LAYER SLICES |
| 1 | DEBLOCKING PARAMETERS ARE PRESENTED FOR BOTH BASE AND ENHANCED LAYER SLICES |
| 2 | DEBLOCKING PARAMETER IS NOT PRESENTED FOR BASE LAYER SLICE AND IS PRESENTED FOR EACH ENHANCED LAYER SLICE |
| 3 | DEBLOCKING PARAMETER IS PRESENTED FOR THE BASE LAYER SLICE AND IS NOT PRESENTED FOR ANY OF THE ENHANCED LAYER SLICES |

In the embodiment illustrated in Table 1, the flag values "0" and "1" of the deblocking filter control present flag 709 are unchanged from the conventional configuration. Thus, if the deblocking filter control present flag 709 is "0", then the default value of "0" is assumed for the IDC deblocking disable control parameters and the deblocking parameters for all layers (e.g., $IDC_0, IDC_1, IDC_2, \ldots, IDC_N, AO_0, AO_1, AO_2, \ldots, AO_N, BO_0, BO_1, BO_2, \ldots, BO_N$) and need not be presented in the slice headers 717. Also, if the deblocking filter control present flag 709 is "1", then the IDC deblocking disable control parameters and the offset parameters are presented for both the base layer slice and the enhanced layer slices. In this case, deblock filtering may be disabled for the base layer slice and any of the enhanced layer slices if desired, although the IDC deblocking disable control parameters and the offset parameters must be presented. The deblocking filter control present flag 709 may also be set to "2", meaning that the IDC deblocking disable control parameter and the offset parameters for the base layer slice are not presented and that the IDC deblocking disable control parameter and the offset parameters for each enhanced layer slice are presented. In this case, the IDC deblocking disable control parameter for the base layer slice is a default "0" so that deblock filtering is enabled for the base layer slice by default. The IDC deblocking disable control parameter and the offset parameters are presented for each enhanced layer slice so that deblock filtering may be enabled or disabled separately for each enhanced layer slice. The deblocking filter control present flag 709 may also be set to "3", meaning that the IDC deblocking disable control parameter and the offset parameters for the base layer slice are presented but the IDC deblocking disable control parameters and the offset parameters for enhanced layer slices are not presented. In this case, deblock filtering may be enabled or disabled for the base layer slice and is enabled by default for each enhanced layer slice.

FIG. 8 is a block diagram depicting deblocking filter control information provided in the bitstream BTS substantially identical to that shown in FIG. 7 except illustrating the specific case when the deblocking filter control present flag 709 is set to "2". As noted above, when the deblocking filter control present flag 709 is set to "2", the IDC deblocking disable control parameter and the offset parameters ($IDC_0$, $AO_0$, $BO_0$) for each base layer slice 711 are not presented and thus are not included within the slice headers 717 (even though the base layer slices 711 and corresponding headers are still included). The remaining IDC deblocking disable control parameter and offset parameters ($IDC_{1-N}$, $AO_{1-N}$, $BO_{1-N}$) are presented for the enhanced layer slices 713 so that deblock filtering may be separately enabled or disabled for each of the enhanced layer slices 713. This additional state of the deblocking filter control present flag 709 is potentially most useful since deblock filtering is potentially more valuable at the base layer than at each of the enhanced layers. The enhanced layer slices 713 already include a greater number of bits providing a greater level of accuracy and thus a reduced amount of the block effect. As described further below, however, the content complexity of the video stream is examined to determine whether deblock filtering is useful for each enhanced layer.

The additional state of "3" for the deblocking filter control present flag 709 is also useful in certain situations for significantly reducing the amount of bits in the bitstream BTS. In this case, the IDC deblocking disable control parameter and the offset parameters for the base layer slice ($IDC_0$, $AO_0$, $BO_0$) are presented but the remaining IDC deblocking disable control parameters and the offset parameters for the enhanced layer slices are not included. In this manner, all of the bits related to deblock filtering for the enhanced layer slices are not presented and thus assumed to be "0" for enabling deblock filtering at the enhanced layers. The "3" state for the deblocking filter control present flag 709 is advantageous for certain applications, such as video conferencing or the like, in which the video decoder will likely not display the base layer but instead will display one of the higher quality enhanced layers, so that deblock filtering at the base layer is less useful. In this manner, deblock filtering of the base layer slice is optionally disabled whereas deblock filtering is enabled for each of the enhanced layer slices by default.

Figure 9:
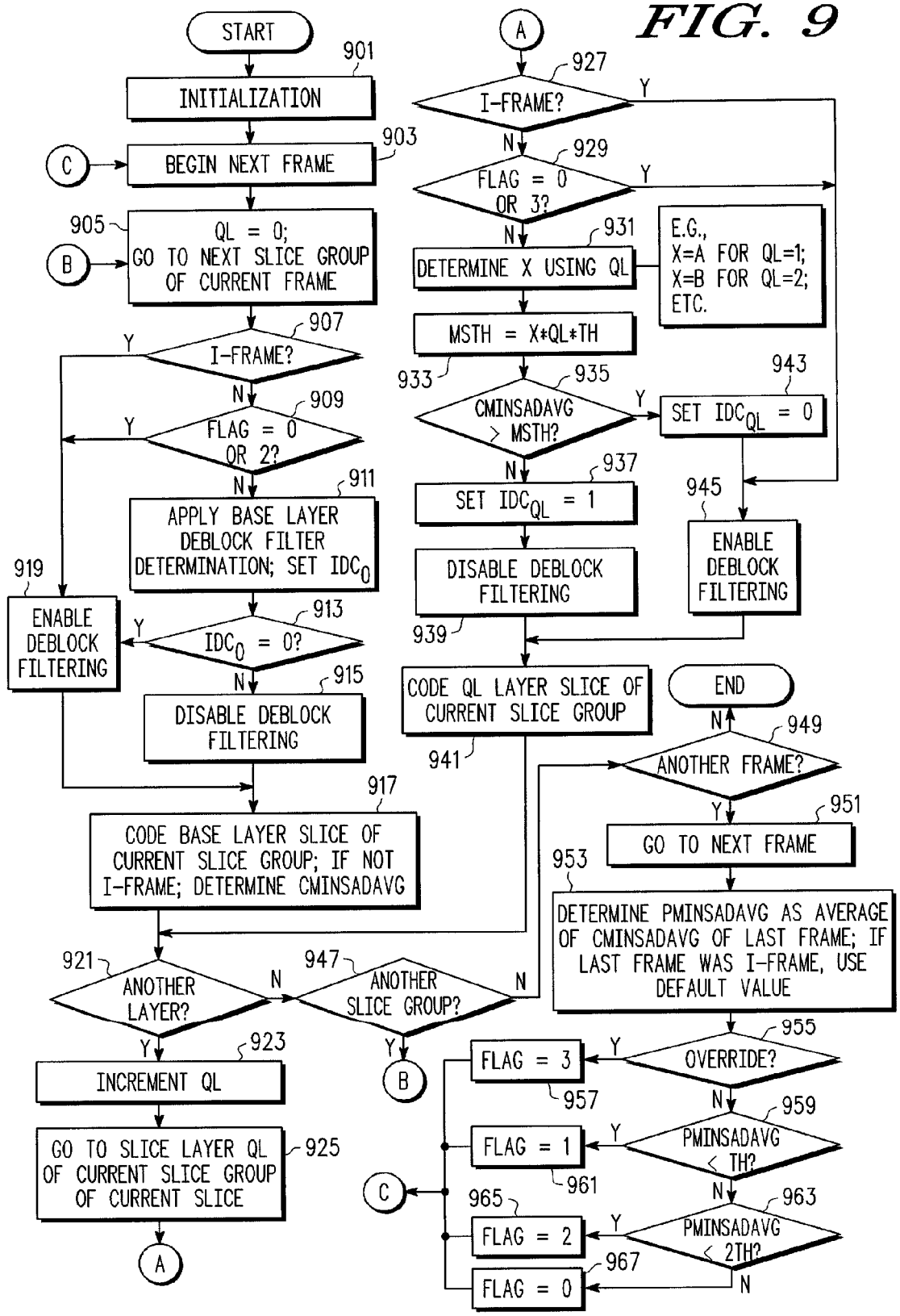
FIG. 9 is a flowchart diagram illustrating exemplary operation of the SVC video encoder of FIG. 6 while encoding each slice layer of each slice group of each frame of a video sequence incorporated into the output bitstream OBTS, for determining and setting the state of the deblocking filter control present flag for each video frame, and for setting the IDC deblocking disable control parameter for each layer of each slice of each frame.

FIG. 9 is a flowchart diagram illustrating exemplary operation of the SVC video encoder 601 while encoding each slice layer of each slice group of each frame of a video sequence incorporated into the output bitstream OBTS, for determining and setting the state of the deblocking filter control present flag for each video frame, and for setting the IDC deblocking disable control parameter for each layer of each slice of each frame. Again, each "slice group" is a grouping of corresponding or associated slices between the base layer and the enhanced layers that have a corresponding complexity factor. It is noted that the deblock control circuit 604 may determine the appropriate state of each deblocking filter control present flag of each frame and the corresponding values of the deblocking disable control parameters, and that these states or values are thus effectively set by the deblock control circuit 604 or otherwise the states or values are communicated to the appropriate block or circuitry, such as, for example, an output circuit similar to the output circuit 125. The content characteristic used in the illustrated embodiments is a content complexity measurement, which is more specifically an average of MINSAD values, although alternative content characteristics or complexity measurements are contemplated, such as MV information, mean square errors, number of coding bits for a frame or slice, picture statistics, etc. During operation, the SVC video encoder 601 determines and sets the state of the deblocking filter control present flag 709 for each video frame and sets the IDC deblocking disable control parameter for each layer of each slice group of each frame. Although operation is illustrated for quality scalability, operation is similar for other scalable factors, such as spatial scalability in which other thresholds are determined or adjusted. Operation begins at a first block 901 in which the system is initialized to begin processing a new video sequence, such as reading headers and initializing variables and thresholds and the like. Operation advances to block 903 to begin the coding process for the next (or first) frame of the video sequence. In the first iteration of the flowchart, the "next" frame is the first video frame of the video sequence, which is usually and I-frame. Operation advances to block 905 in which a quality layer (QL) parameter is set equal to "0" to indicate the base layer slice, and operation begins with the next (or first) slice group of the current (or first) video frame. Operation then proceeds to block 907 to query whether the current frame being coded is an I-frame. As noted above, the first frame is usually an I-frame, so that operation proceeds to block 919 to enable deblock filtering. If the current frame is not an I-frame, operation proceeds instead to block 909 to query whether the deblocking filter control present flag, or "FLAG", is equal to "0" or "2". If so, then the IDC deblocking disable control parameter is not to be presented for the base layer slice so that deblock filtering is to be enabled by default. Also, when an IDC deblocking disable control parameter is not to be presented, the corresponding deblock offset parameters are also not presented. Thus, if the FLAG is equal to "0" or "2" at block 909, operation proceeds to block 919 to enable deblock filtering. It is noted that FLAG may not be determined at this point for the first frame, which is inconsequential since the first frame is an I-frame and this processing block is bypassed. If for any reason this processing block may be reached before the FLAG is set for the prior frame (such as a case in which the first frame is not an I-frame), then FLAG may be initialized at block 901 to a predetermined default value.

If the current frame is not an I-frame and if the FLAG is not is equal to "0" or "2", then operation proceeds to block 911 in which a base layer deblock filter determination is made based on previously determined content complexity and the IDC deblocking disable control parameter $IDC_0$ for the base layer slice of the current slice group is set accordingly. Although not shown, the corresponding offset parameters for the base layer slice may also be determined and set at this time. The method described in the flowchart of FIG. 4 may be employed in which the chroma and luma deblock filtering may or may not be separately considered and in which PSF is optionally considered. If it is determined at block 911 to enable deblock filtering for the base layer slice of the current slice group, then $IDC_0$ is set equal to "0". Otherwise, if it is determined at block 911 to disable deblock filtering for the base layer slice of the current slice group with default "0" for all the three deblocking parameters, then $IDC_0$ is set equal to "1". Operation then proceeds to block 913 to query whether $IDC_0$ has been set to "0". If so, then operation proceeds to block 919 to enable deblock filtering for coding the base layer slice of the current slice group. If $IDC_0$ is not "0" as determined at block 913, then operation proceeds instead to block 915 in which deblock filtering is disabled for the base layer slice of the current slice group. After deblock filtering is enabled or disabled, operation proceeds to block 917 in which the base layer slice of the current slice group of the current frame is coded. If the current frame is not an I-frame, then a CMINSADAVG value is also determined at block 917 for the current base layer slice. In one embodiment, the CMINSADAVG value is the average of the MINSAD values of the macroblocks for the current base layer slice being coded by the video encoder 601. In one embodiment similar to that described above for the deblock control circuit 135, for example, a running average of MINSAD values for each macroblock of the current base layer slice being coded is stored/updated as the CMINSADAVG value for the corresponding slice group. As understood by those skilled in the art, motion estimation is not performed while coding an I-frame so that MINSAD values are not determined. For other frame types (P-frames, B-frames, etc.), motion estimation is performed for each macroblock in the current slice group and a corresponding MINSAD value is determined. The CMINSADAVG is the average of the MINSAD values for the current base layer slice being encoded and is used for determining whether to enable or disable deblock filtering for the enhanced layer slices of the same slice group as further described below.

After the base layer slice is encoded at block 917 (and after CMINSADAVG is determined if not an I-frame), operation proceeds to block 921 to query whether another layer exists for the current slice group. Since at least one enhanced layer slice is usually included for the scalable configurations, operation proceeds to block 923 in which the QL value is incremented to advance to the next layer of the current slice group. If the current layer is the base layer, as is the case for the first iteration, then the QL value is incremented from 0 to 1. Operation then proceeds to block 925 to advance to the next higher-layer slice of the current slice group of the current frame, denoted as "slice layer QL". For example, slice layer 0 denotes the base layer slice of the current slice group, slice layer 1 denotes the first enhanced layer of the current slice group, and so on. Operation then proceeds to block 927 to query whether the current frame is an I-frame in a similar manner as block 907. If the current frame is an I-frame, which is typically the case for the first frame of the video sequence, operation proceeds to block 945 to enable deblock filtering for the current enhanced layer slice of the current slice group. If the frame is not an I-frame, then operation proceeds to block 929 to query whether the FLAG is 0 or 3. If the value of FLAG is 0 or 3, then the IDC deblocking disable control parameter is not presented (and the corresponding offset parameters are also not presented) for the current enhanced layer slice and is assumed to be equal to "0", in which case deblock filtering is enabled at block 945.

If the current frame is not an I-frame and FLAG is not 0 or 3, then operation proceeds to block 931 to determine a predetermined coefficient value "X" for the current slice layer being encoded. In various embodiments, the QL value indicates the layer being coded and is used to determine the X value for the particular layer. In one embodiment, for example, X is set equal to a first predetermined coefficient value "A" for the first enhanced layer, to a second predetermined coefficient value "B" for the second enhanced layer, and so on. In one embodiment, a memory, such as a lookup table or the like, may be employed at block 931 in which the QL value is used as an address value into the lookup table to access the corresponding predetermined coefficient value stored in the lookup table. In one embodiment, A=B=1.5, although other values are contemplated and the predetermined coefficients may be the same or different values depending upon the particular configuration. At next block 933, a threshold value MSTH is set equal to X*QL*TH, in which X is the predetermined coefficient value determined at block 931, QL is the current layer number, and TH is a predetermined threshold value. In one embodiment, TH is equal to 1,024 although alternative values are contemplated. Operation then proceeds to block 935 to compare the CMINSADAVG value with MSTH determined at block 933. If CMINSADAVG is greater than MSTH as determined at block 935, then the content complexity of the current slice layer, as indicated by the CMINSADAVG value, is considered sufficiently high so that deblock filtering should be enabled for the current enhanced layer slice. Thus, if the CMINSADAVG value is greater than MSTH, operation proceeds to block 943 in which the IDC deblocking disable control parameter for the current slice layer, shown as $IDC_{QL}$, is set equal to "0" and operation proceeds to block 945 to enable deblock filtering for the current enhanced layer slice as indicated by QL. If, on the other hand, the CMINSADAVG value is not greater than MSTH as determined at block 935, operation proceeds instead to block 939 in which the IDC deblocking disable control parameter $IDC_{QL}$ for the current slice layer is set equal to "1" and operation proceeds to block 939 to disable deblock filtering for the current layer.

At this point it is noted that if it is desired to separately enable luma and chroma deblock filtering, then the IDC deblocking disable control parameters ($IDC_0$, $IDC_1$, $IDC_2$, . . . , $IDC_N$) are modified to be able to distinguish between enable and disable of chroma and luma deblock filtering. Also, separate thresholds are determined for luma and chroma deblock filtering, such as the case described in FIG. 4 for the non-scalable configuration. Furthermore, although not shown, the corresponding offset parameters may be determined and set at blocks 937 or 945. Although FIG. 9 illustrates exemplary operation for quality scalability, other scalability types are contemplated such as spatial scalability for which other threshold values may be used and/or modified. Furthermore, for spatial scalability embodiments and the like, motion estimation may be performed separately for each enhanced layer and corresponding content characteristic information, such as MV information or MINSAD information or mean square error or the like, may be determined for each spatial layer. In this case, the content characteristic determined while coding slices of each layer may be used for adaptively disabling deblock filtering for subsequently coded slices of the same layer similar to that shown and described in FIG. 4 for the base layer. Thus, rather than using base layer content characteristic information for adaptively disabling deblock filtering for the higher layers, content characteristic information determined for previously coded information at the same layer may be used instead. In addition, although FIG. 9 illustrates the exemplary operation by coding each slice layer in slice groups in an incremental layer order, e.g., from base layer of QL=0 to enhanced layers based on the slice group concept as explained in FIGS. 7 and 8, other coding orders may be applied instead. For example, all of the base layer slices of a frame may be coded first, followed by the coding of all of the first enhanced layer slices of the same frame, and so on. Regardless of the particular coding order, the CMINSADAVG value determined while coding each base layer slice is used for determining the IDC deblock filtering parameters for the corresponding enhanced layer slices of the same slice group as defined herein. The flowchart of FIG. 9 is modified to reflect the particular coding order, although the threshold values may remain unmodified if desired.

After deblock filtering is enabled or disabled for the current slice layer of the current slice group, the current QL enhanced layer slice of the current slice group is coded at next block 941. Operation then returns to block 921 to query whether there are any more enhanced layers in the current slice group. If there are additional layers of the current slice group, operation proceeds to block 923 to increment QL, then to block 925 to advance to the next enhanced layer slice of the current slice group, and then back to block 927 to begin the coding process for the next enhanced layer slice of the current slice group and to determine and set the corresponding IDC deblocking disable control parameter (and to determine and set the corresponding offset parameters). Operation loops in this manner to code each slice layer of the current slice group. During each layer, a corresponding "X" coefficient is selected at block 931, a corresponding threshold MSTH is selected at block 933 using the corresponding coefficient and an incremented value of QL to modify TH, and the CMINSADAVG value is compared with the corresponding threshold at block 935. In the illustrated embodiment, the MSTH threshold is increased so that it becomes more likely for deblock filtering to be disabled for the higher layer slices as compared to the lower layer slices of each slice group. After coding of the last slice layer of the current slice group, operation proceeds to block 947 to query whether there is another slice group in the current frame. If so, operation loops back to block 905 to reset QL back to zero and to advance to the next slice group of the current frame. Operation thus loops for each slice group of the current frame and for each slice layer of each slice group of video information. As noted above, the first frame is an I-frame so that deblock filtering is enabled to encode each layer of each slice of the first I-frame.

After the last slice group of the current frame is completed, operation proceeds from block 947 to block 949 to query whether there is another frame in the video sequence. If so, operation proceeds to the next frame at next block 951 and then to block 953 to determine a previous frame MINSADAVG value referred to as PMINSADAVG. The PMINSADAVG value is calculated as the average of the CMINSADAVG values determined while coding the base layer slices of the previous frame. If the previous frame was an I-frame such that CMINSADAVG was not determined, then PMINSADAVG is set equal to a DEFAULT value at block 953. In one embodiment, the DEFAULT value for PMINSADAVG is an artificially high value, such as a value 5,096, for example, in order to ensure that the FLAG will be set to "0" for this next frame so that the deblocking parameters are not presented leaving deblock filtering enabled as a default for all layers. In this manner, deblock filtering is enabled for all layers of the first P-frame following an I-frame to improve visual quality. Operation then proceeds to block 955 to determine whether an OVERRIDE flag has been set. If so, operation proceeds to block 957 to set FLAG to "3". The OVERRIDE flag may be set for certain applications, such as video applications or the like, in which the base layer is usually not used in favor of the higher quality enhanced layers as previously described (so that deblock filtering may be disabled at the base layer and enabled at each of the enhanced layers). If the OVERRIDE flag is not set, then operation proceeds to block 959 to compare PMINSADAVG with TH. If PMINSADAVG is less than TH, denoting a very low amount of complexity of the video content, then FLAG is set equal to "1" at block 961 to allow deblock filtering to be disabled at all slice layers. If PMINSADAVG is not less then TH but is less than twice TH (or 2TH) as determined at next block 963, then operation proceeds to block 965 to set FLAG equal to "2". In this case, FLAG is set equal to "2" so that deblock filtering is performed at the base layer slice but optionally disabled for the enhanced layer slices. If PMINSADAVG is not less than 2TH as determined at block 963, then operation proceeds to block 967 to set FLAG equal to "0" for the case of a relatively high amount of complexity of the video content. In this case the deblocking parameters are not presented for base and enhanced layer slices so that deblock filtering is enabled by default for all slice layers.

After the deblocking filter control present flag 709, or FLAG, is set at any of blocks 957, 961, 965 or 967, operation loops back to block 903 to begin processing the next video frame in the video sequence. In this manner, the deblocking filter control present flag 709 is set for each frame of the video sequence to control the presentment of the IDC deblocking disable control parameters for each frame (and the offset parameters). If the IDC deblocking disable control parameter is to be presented for the base layer slice, it is determined at block 911 and inserted into the slice header for the base layer slice. If the IDC deblocking disable control parameter is to be presented for any of the enhanced layer slices, it is set at block 943 or block 937 and inserted into the slice header for each slice layer. The additional values of "2" and "3" for the deblocking filter control present flag 709 allows the ability to avoid presenting the IDC deblocking disable control parameters at either the base layer slice or the enhanced layer slices to avoid wasting bits in the bitstream while maintaining the desired tradeoff between video quality and complexity reduction.

Figure 10:
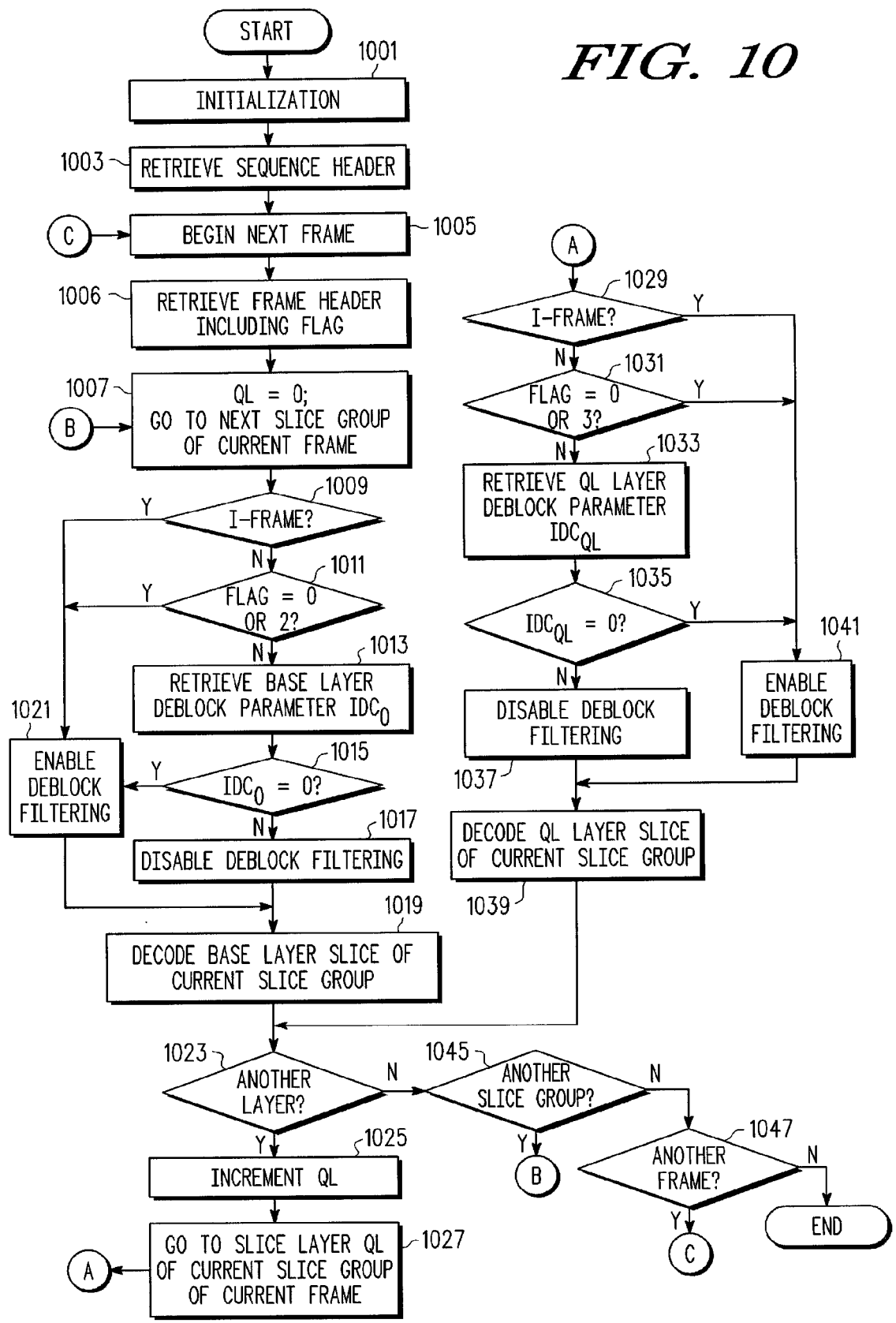
FIG. 10 is a flowchart diagram illustrating exemplary operation of the SVC video decoder of FIG. 6 for decoding each slice layer of each slice group of each frame of a video sequence received from the input bitstream IBTS.

FIG. 10 is a flowchart diagram illustrating exemplary operation of the SVC video decoder 603 for decoding each slice layer of each slice group of each frame of a video sequence received from the input bitstream IBTS. The decoding process shown in FIG. 10 is similar to that of the encoding processed described above for FIG. 9 in which the slices are processed in slice groups in which each slice group includes a base layer slice and one or more enhanced layer slices. It is appreciated that the video decoder may process the slices in alternative orders, such as processing each of the base layer slices of each frame first, followed by the first enhanced layer slices, followed by the second enhanced layer slices (if any), and so on. Operation begins at a first block 1001 in which the SVC video decoder 603 performs initialization. Operation then advances to block 1003 in which a sequence is detected in the input bitstream IBTS, where the SVC video decoder 603 retrieves and processes the sequence header. Operation then proceeds to block 1005 to begin processing the next (or first) frame in the video sequence. At next block 1006, the frame header is retrieved including the state of the deblocking filter control present flag, or FLAG, in the frame header. Operation then proceeds to next block 1007 in which a quality layer (QL) parameter for the video decoder 603 is set equal to zero indicating the base layer. The SVC video decoder 603 begins processing the base layer of the next slice group of the current frame as indicated at block 1007.

At next block 1009, it is queried whether the current frame is an I-frame. If so, which is usually the case for the first frame of the video sequence, operation proceeds to block 1021 in which deblock filtering is enabled. Otherwise, if the frame is not an I-frame, operation proceeds to block 1011 to query whether FLAG is 0 or 2. If so, then the video decoder 603 determines that the deblocking parameters are not presented and thus the corresponding IDC deblocking disable control parameter for the base layer ($IDC_0$) and the offset parameters are the default value "0", and operation proceeds to block 1021 to enable deblock filtering. Otherwise, if FLAG is not 0 or 2, then operation proceeds instead to block 1013 in which the base layer deblock parameter $IDC_0$ is retrieved from the base layer slice header. Operation then proceeds to block 1015 to query whether $IDC_0$ has been set to "0". If $IDC_0$ is "0", then operation proceeds to block 1021 to enable deblock filtering with either zero and non-zero offset values. Otherwise, $IDC_0$ is "1" and operation proceeds to block 1017 to disable deblock filtering. From either of blocks 1017 or 1021, operation proceeds to block 1019 in which the SVC video decoder 603 decodes the current base layer slice.

From block 1019, operation proceeds to block 1023 to query whether another layer exists in the current slice group. If so, then operation proceeds to block 1025 in which QL is incremented and then to block 1027 in which operation advances to process the next slice layer QL of the current slice group of the current frame. From block 1027, operation advances to block 1029 in which it is queried whether the current frame is an I-frame. If so, operation proceeds to block 1041 to enable deblock filtering for the current slice layer. If the frame is not an I-frame, then operation proceeds instead to block 1031 to query whether FLAG is 0 or 3. If FLAG is 0 or 3, then deblocking parameters are not presented in the slice header of the current enhanced layer slice and is assumed to be the default value of "0", so that operation proceeds to block 1041 to enable deblock filtering. Otherwise, if not an I-frame and FLAG is not 0 or 3, operation proceeds to block 1033 in which the SVC video decoder 603 retrieves the deblock parameter $IDC_{QL}$ from the slice header of the QL enhanced layer slice. Operation then proceeds to block 1035 to query whether $IDC_{QL}$ is "0". If $IDC_{QL}$ is "0", operation proceeds to block 1041 to enable deblock filtering with the default offset values "0". Otherwise operation proceeds to block 1037 to disable deblock filtering for the current enhanced layer slice. Operation then proceeds to block 1039 in which the enhanced QL layer slice is decoded with deblocking either enabled or disabled.

After the current enhanced layer slice is processed, operation then proceeds back to block 1023 to query whether there is another layer in the current slice group. If so, QL is incremented at block 1025 and operation advances to process and decode the next QL layer slice in blocks 1029-1041 as previously described. Otherwise, if all slices of the current slice group have been processed, operation advances to block 1045 to query whether there is another slice group in the current frame. If so, operation loops back to block 1007 to reset QL back to zero and to advance to the base layer slice of the next slice group in the current frame. Operation loops in this manner to process each of the slice layers of each slice group of the current frame. When all of the slice groups of the current frame have been processed, operation proceeds to block 1047 to query whether there is another frame in the video sequence. If so, operation loops back to block 1005 to begin processing the next frame in the video sequence. When all of the frames of the video sequence have been processed as determined at block 1047, operation is completed for the video sequence. Operation repeats in a similar manner for additional video sequences in the input bitstream IBTS.

The SVC video decoder 603 retrieves the deblocking filter control present flag 709 in the frame header of each frame to determine whether any of the IDC deblocking disable control parameters are presented. During normal operation, if an IDC deblocking disable control parameter is not presented for a slice layer, then the SVC video decoder 603 enables the deblocking filter for that slice layer during the decoding process. During normal operation, if an IDC deblocking disable control parameter is presented for a slice layer, then the SVC video decoder 603 further retrieves that deblocking parameter from the slice header for that slice layer to determine whether to enable or disable deblock filtering for that slice layer.

In one embodiment, the SVC video decoder 603 is configured to disable deblock filtering for any one or more of the enhanced layer slices regardless of the state of the deblocking filter control present flag 709 or the corresponding IDC deblocking disable control parameter. Simulation results have revealed that deblock filtering may be disabled at the SVC video decoder 603 in an enhanced layer without introducing error drift or with only a very limited amount of error drift. Also, deblock filtering for the quality layer of SVC may be disabled or reduced without relatively slight visual quality degradation. In this manner, the SVC video decoder 603 may be configured to override the flags and deblock control parameters to disable deblock filtering at an enhanced layer for any purpose, such as to reduce computational complexity or to save power as necessary or desired.

As described herein, deblock filtering is adaptively disabled based on a characteristic of the content of the video information. In one embodiment, the content characteristic is content complexity, where the relative complexity of the video information may be measured using MINSAD values determined during motion estimation, such as averaging multiple MINSAD values of a slice of each frame of a video sequence. Other methods may be used to determine the relative complexity of the content of video information, such as, for example, mean square error, frame statistics, the number of bits used for coding a slice or a frame, etc. The use of the MINSAD values is particularly advantageous since they provide a relatively accurate measure of the complexity of the video content and since they are already calculated during motion estimation. Other content characteristics may be employed, such as motion vector information indicative of the relative amount of motion of the video information.

The phrase "adaptively disabling deblock filtering" as used herein refers to enabling or disabling or turning on or off all or a portion of deblock filtering of video information. Based on the content characteristic of the video information, deblock filtering may be fully disabled or fully enabled or partially disabled for all or a portion of the video information. Partial disablement of deblock filtering concerns disablement of a portion of the deblock filtering process itself and/or disablement of deblock filtering of a portion of the video content. Partial disablement of the deblock filtering process itself concerns disablement of either one of luma or chroma deblock filtering. For example, partial disablement occurs when either one of luma or chroma deblock filtering is disabled for a selected portion of video information based on the content characteristic, such as, for example, selected slices or selected layers (SVC configurations) of slices of a video sequence. Partial disablement of deblock filtering of a portion of video content concerns partial or full disablement of deblock filtering for selected slices or selected layers of a multilayer configuration. In SVC configurations, for example, partial disablement occurs when deblock filtering is disabled for selected slice layers of video content, such as selected base or enhanced layer slices of video content. In SVC configurations, partial disablement of deblock filtering also occurs if at least a portion of the deblock filtering process is disabled, such as one of luma or chroma deblock filtering, for some but not all of the layers including the base layer and one or more enhanced layers.

A method of generating a video sequence which includes multiple layers according to one embodiment includes providing multiple frames in the video sequence, each frame includes a frame header, and setting a deblocking control flag in a frame header of a selected frame to a selected one of multiple states to indicate that a deblocking parameter is presented for at least one and less than all of layers of the selected frame. The layers may include a base layer and one or more enhanced layers. The method may include setting the deblocking control flag to a selected state to indicate that a deblocking parameter is not presented for the base layer and is presented for each enhanced layer. The method may include setting the deblocking control flag to a selected state to indicate that a deblocking parameter is presented for the base layer and is not presented for each enhanced layer. The method may include setting the deblocking control flag to a selected state to indicate that a deblocking parameter is presented for at least one and less than all of the enhanced layers.

The method may further include determining a content characteristic of the video sequence, and setting the deblocking control flag based on the content characteristic. The method may include setting the deblocking control flag based on a content characteristic of a previously coded frame.

The method may further include determining a content characteristic of the selected frame and comparing the content characteristic to first and second thresholds. In this case, if the content characteristic is less than the first threshold, the method includes setting a deblocking control flag in a frame header of a next frame to a selected state to indicate that a deblocking parameter is presented for each layer of the next frame. If the content characteristic is not less than the first threshold and is less than the second threshold, the method may include setting the deblocking control flag in the frame header of the next frame to a selected state to indicate that a deblocking parameter is presented for at least one and less than all of the layers of the next frame. If the content characteristic is not less than the second threshold, the method may include setting the deblocking control flag to a selected state to indicate that a deblocking parameter is not presented for any of the layers of the next frame.

A method of processing a received video sequence which includes multiple layer according to one embodiment includes determining which of multiple states that a deblocking control flag from a frame header of a selected frame in the video sequence is set, and retrieving a deblocking parameter for at least one but less than all of the layers of the selected frame based on the determined state of the deblocking control flag. The method may include determining a value of the retrieved deblocking parameter and disabling deblock filtering for the at least one but less than all of the layers of the selected frame based on the determined value of the retrieved deblocking parameter.

The layers may include a base layer and one or more enhanced layers. The method may include retrieving a deblocking parameter only for the at least one enhanced layer based on the determined state of the deblocking control flag. The method may include retrieving a deblocking parameter only for the base layer based on the determined state of the deblocking control flag. The method may include retrieving a deblocking parameter for some and less than all of the enhanced layers based on the determined state of the deblocking control flag. The method may further include disabling deblock filtering of one or more enhanced layers regardless of the determined state of the deblocking control flag.

A scalable video system according to one embodiment includes a video encoder and a deblocking control circuit. The video encoder generates a video sequence including multiple frames, each including multiple layers and a frame header. The deblocking control circuit sets a state of a deblocking control flag in a frame header of a selected frame to a selected one of multiple states to indicate that a deblocking parameter is presented for at least one and less than all of the layers of the selected frame. The deblocking control circuit may disable deblock filtering for one or more and less than all of the layers of the selected frame based on corresponding values of retrieved deblocking parameters.

In various embodiments the layers may include a base layer and at least one enhanced layer. The deblocking control circuit may set the state of the deblocking control flag in the frame header to indicate that a deblocking parameter is not presented for the base layer and is presented for at least one enhanced layer. The deblocking control circuit may set the state of the deblocking control flag in the frame header to indicate that a deblocking parameter is presented for the base layer and is not presented for the at least one enhanced layer. The deblocking control circuit may set the state of the deblocking control flag in the frame header to indicate that a deblocking parameter is presented for at least one and less than all of multiple enhanced layers.

The scalable video system may include a motion estimation circuit having an output providing a characteristic indicative of content of the video sequence. In this case, the deblocking control circuit may set the selected state of the deblocking control flag based on the characteristic. The deblocking control circuit may set the state of the deblocking control flag of a selected frame based on the characteristic determined for a previously coded frame.

A scalable video system according to one embodiment includes a video decoder and a deblocking control circuit. The video decoder receives a video sequence including multiple frames, each including multiple layers and a frame header. The deblocking control circuit determines which of multiple states that a deblocking control flag in a frame header of a selected frame is set. The deblocking control circuit retrieves a deblocking parameter for at least one but less than all of the layers of the selected frame based on the state that the deblocking control flag is set. The deblocking control circuit may disable deblock filtering for each layer of the selected frame based on a value of a corresponding deblocking parameter that was retrieved.

In various embodiments, the layers may include a base layer and at least one enhanced layer. The deblocking control circuit may retrieve a deblocking parameter only for each enhanced layer based on the state that the deblocking control flag is set. The deblocking control circuit may retrieves a deblocking parameter only for the base layer. The deblocking control circuit may retrieve a deblocking parameter for one or more of multiple enhanced layers. The scalable video system may include a deblocking filter, where the deblocking control circuit causes the deblocking filter to deblock filter the at least one enhanced layer regardless of the state of the deblocking control flag.

Although the present invention has been described in considerable detail with reference to certain preferred versions thereof, other versions and variations are possible and contemplated. For example, circuits or logic blocks described herein may be implemented as discrete circuitry or integrated circuitry or software or any alternative configurations. Also, although the present invention has been described herein with respect to video information, it is appreciated that the present invention applies more generally to any "image information", such as video (e.g. MPEG and the like), and image, or image sequencing, such as, for example, JPEG, MJPEG, JPEG2000, MJPEG2000, etc. The term "image information" as used herein is intended to apply to any video or image or image sequence information. Finally, those skilled in the art should appreciate that they can readily use the disclosed conception and specific embodiments as a basis for designing or modifying other structures for carrying out the same purposes of the present invention without departing from the spirit and scope of the invention as defined by the appended claims.

The invention claimed is:

1. A method of generating a video sequence which includes a plurality of layers, comprising:
providing a plurality of frames in the video sequence, each frame comprising a frame header;
setting a deblocking control flag in a frame header of a selected frame to a selected one of a plurality of states to indicate that a deblocking parameter is presented for at least one and less than all of the plurality of layers of the selected frame;
determining a content characteristic of the selected frame;
comparing the content characteristic to first and second thresholds;
if the content characteristic is less than the first threshold, setting a deblocking control flag in a frame header of a next frame to a selected state to indicate that a deblocking parameter is presented for each of the plurality of layers of the next frame;
if the content characteristic is not less than the first threshold and is less than the second threshold, setting the deblocking control flag in the frame header of the next frame to a selected state to indicate that a deblocking parameter is presented for at least one and less than all of the plurality of layers of the next frame; and
if the content characteristic is not less than the second threshold, setting the deblocking control flag in the frame header of the next frame to a selected state to indicate that a deblocking parameter is not presented for any of the plurality of layers of the next frame.

2. The method of claim 1, the plurality of layers comprising a base layer and at least one enhanced layer, wherein said setting a deblocking control flag comprises setting the deblocking control flag to a selected state to indicate that a deblocking parameter is not presented for the base layer and is presented for the at least one enhanced layer.

3. The method of claim 1, the plurality of layers comprising a base layer and at least one enhanced layer, wherein said setting a deblocking control flag comprises setting the deblocking control flag to a selected state to indicate that a deblocking parameter is presented for the base layer and is not presented for the at least one enhanced layer.

4. The method of claim 1, the plurality of layers comprising a base layer and a plurality of enhanced layers, wherein said setting a deblocking control flag comprises setting the deblocking control flag to a selected state to indicate that a deblocking parameter is presented for at least one and less than all of the plurality of enhanced layers.

5. The method of claim 1, further comprising:
determining a content characteristic of the video sequence; and
wherein said setting a deblocking control flag comprises setting the deblocking control flag based on the content characteristic of the video sequence.

6. The method of claim 5, wherein said setting the deblocking control flag based on a content characteristic of the video sequence comprises setting the deblocking control flag in a frame header of the selected frame based on a content characteristic of a previously coded frame.

7. A scalable video system, comprising:
a video encoder which generates a video sequence comprising a plurality of frames, each of said plurality of frames comprising a plurality of layers and a frame header;
a deblocking control circuit which sets a state of a deblocking control flag in a frame header of a selected one of said plurality of frames to a selected one of a plurality of states to indicate that a deblocking parameter is presented for at least one and less than all of said plurality of layers of said selected frame;
a motion estimation circuit having an output providing a content characteristic indicative of at least one characteristic of content of said selected frame;
wherein said deblocking control circuit sets a deblocking control flag in a frame header of a next frame to a selected state to indicate that a deblocking parameter is presented for each of a plurality of layers of said next frame if said content characteristic is less than a first threshold;
wherein said deblocking control circuit sets said deblocking control flag in said frame header of said next frame to a selected state to indicate that a deblocking parameter is presented for at least one and less than all of said plurality of layers of said next frame if said content characteristic is not less than said first threshold and is less than a second threshold; and
wherein said deblocking control circuit sets said deblocking control flag in said frame header of said next frame to a selected state to indicate that a deblocking parameter is not presented for any of said plurality of layers of said next frame if said content characteristic is not less than said second threshold.

8. The scalable video system of claim 7, wherein:
said plurality of layers comprises a base layer and at least one enhanced layer; and
wherein said deblocking control circuit sets said state of said deblocking control flag in said frame header to a state that indicates that a deblocking parameter is not presented for said base layer and is presented for said at least one enhanced layer.

9. The scalable video system of claim 7, wherein:
said plurality of layers comprising a base layer and at least one enhanced layer; and
wherein said deblocking control circuit sets said state of said deblocking control flag in said frame header to a state to indicate that a deblocking parameter is presented for said base layer and is not presented for said at least one enhanced layer.

10. The scalable video system of claim 7, wherein:
said plurality of layers comprises a base layer and a plurality of enhanced layers; and
wherein said deblocking control circuit sets said state of said deblocking control flag in said frame header to a state to indicate that a deblocking parameter is presented for at least one and less than all of said enhanced layers.

11. The scalable video system of claim 7, wherein:
said output of said motion estimation circuit providing a content characteristic indicative of at least one characteristic of content of said video sequence; and
wherein said deblocking control circuit sets said state of said deblocking control flag of said selected one of said plurality of frames based on said content characteristic of said video sequence.

12. The scalable video system of claim 7,
wherein said deblocking control circuit sets said state of said deblocking control flag of said selected one of said plurality of frames based on said content characteristic determined for a previously coded frame.

13. A method of generating a video sequence which includes a plurality of layers, comprising:

providing a plurality of frames in the video sequence, each frame comprising a frame header;

determining a content characteristic of a selected frame and comparing the content characteristic to first and second thresholds;

if the content characteristic is less than the first threshold, setting a deblocking control flag in a frame header of the selected frame to a selected state to indicate that a deblocking parameter is presented for each of the plurality of layers of the selected frame;

if the content characteristic is not less than the first threshold and is less than the second threshold, setting the deblocking control flag in the frame header of the selected frame to a selected state to indicate that a deblocking parameter is presented for at least one and less than all of the plurality of layers of the selected frame; and if the content characteristic is not less than the second threshold, setting the deblocking control flag in the frame header of the selected frame to a selected state to indicate that a deblocking parameter is not presented for any of the plurality of layers of the selected frame.

14. The method of claim 13, the plurality of layers comprising a base layer and at least one enhanced layer, wherein said setting a deblocking control flag comprises setting the deblocking control flag to a selected state to indicate that a deblocking parameter is not presented for the base layer and is presented for the at least one enhanced layer.

15. The method of claim 13, the plurality of layers comprising a base layer and at least one enhanced layer, wherein said setting a deblocking control flag comprises setting the deblocking control flag to a selected state to indicate that a deblocking parameter is presented for the base layer and is not presented for the at least one enhanced layer.

16. The method of claim 13, the plurality of layers comprising a base layer and a plurality of enhanced layers, wherein said setting a deblocking control flag comprises setting the deblocking control flag to a selected state to indicate that a deblocking parameter is presented for at least one and less than all of the plurality of enhanced layers.

17. A scalable video system, comprising:
a video encoder which generates a video sequence comprising a plurality of frames, each of said plurality of frames comprising a plurality of layers and a frame header;

a motion estimation circuit having an output providing a content characteristic indicative of at least one characteristic of content of said video sequence;

a deblocking control circuit that sets a deblocking control flag in a frame header of a selected one of said plurality of frames to a selected state to indicate that a deblocking parameter is presented for each of a plurality of layers of said selected frame if the content characteristic is less than a first threshold;

wherein said deblocking control circuit sets said deblocking control flag in said frame header of said selected frame to a selected state to indicate that a deblocking parameter is presented for at least one and less than all of said plurality of layers of said selected frame if said content characteristic is not less than said first threshold and is less than a second threshold; and wherein said deblocking control circuit sets said deblocking control flag in said frame header of said selected frame to a selected state to indicate that a deblocking parameter is not presented for any of said plurality of layers of said selected frame if said content characteristic is not less than said second threshold.

18. The scalable video system of claim 17, wherein:
said plurality of layers comprises a base layer and at least one enhanced layer; and
wherein said deblocking control circuit sets said state of said deblocking control flag in said frame header to a state that indicates that a deblocking parameter is not presented for said base layer and is presented for said at least one enhanced layer.

19. The scalable video system of claim 17, wherein:
said plurality of layers comprising a base layer and at least one enhanced layer; and
wherein said deblocking control circuit sets said state of said deblocking control flag in said frame header to a state to indicate that a deblocking parameter is presented for said base layer and is not presented for said at least one enhanced layer.

20. The scalable video system of claim 17, wherein:
said plurality of layers comprises a base layer and a plurality of enhanced layers; and
wherein said deblocking control circuit sets said state of said deblocking control flag in said frame header to a state to indicate that a deblocking parameter is presented for at least one and less than all of said enhanced layers.

* * * * *